United States Patent
Ohishi et al.

(10) Patent No.: US 11,089,289 B2
(45) Date of Patent: Aug. 10, 2021

(54) IMAGE PROCESSING DEVICE, IMAGING DEVICE, IMAGE PROCESSING METHOD AND PROGRAM

(71) Applicant: Sony Semiconductor Solutions Corporation, Kanagawa (JP)

(72) Inventors: Takeo Ohishi, Kanagawa (JP); Kazuyuki Yamamoto, Kanagawa (JP); Shuzo Sato, Kanagawa (JP); Takayuki Yoshigahara, Tokyo (JP); Jun Murayama, Tokyo (JP); Ken Nishida, Chiba (JP); Kazuhiro Yamada, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/554,179

(22) PCT Filed: Apr. 22, 2016

(86) PCT No.: PCT/JP2016/002161
§ 371 (c)(1),
(2) Date: Aug. 28, 2017

(87) PCT Pub. No.: WO2016/174858
PCT Pub. Date: Nov. 3, 2016

(65) Prior Publication Data
US 2018/0035097 A1    Feb. 1, 2018

(30) Foreign Application Priority Data

Apr. 27, 2015    (JP) .............................. JP2015-089983

(51) Int. Cl.
*H04N 13/00* (2018.01)
*H04N 13/271* (2018.01)
(Continued)

(52) U.S. Cl.
CPC ....... *H04N 13/271* (2018.05); *G02B 27/0093* (2013.01); *G02B 27/0172* (2013.01);
(Continued)

(58) Field of Classification Search
CPC .. H04N 19/597; H04N 13/271; H04N 13/286; H04N 13/00; H04N 13/156;
(Continued)

(56) References Cited

U.S. PATENT DOCUMENTS 5,267,331 A * 11/1993 Siwoff ............... G02B 27/2235
348/62
5,359,675 A * 10/1994 Siwoff ................ G02B 27/017
382/114
(Continued)

FOREIGN PATENT DOCUMENTS

CN    101610421 A    12/2009
CN    103796001 A    5/2014
(Continued)

OTHER PUBLICATIONS

Japanese Office Action dated Jun. 25, 2019 for corresponding Japanese Application No. 2015-089983.
(Continued)

*Primary Examiner* — Frank F Huang
(74) *Attorney, Agent, or Firm* — Michael Best & Friedrich LLP

(57) ABSTRACT

An image processing device includes depth acquisition circuitry that uses a parallax corresponding to image data to electronically generate a depth map of an image and object detection circuitry that uses distance information and the depth map to electronically detect a specific object in the image by identifying specific pixels in the image data. The depth map includes information that pertains to distances from a reference position for each pixel in the image.

19 Claims, 42 Drawing Sheets

(51) Int. Cl.
*G02B 27/01* (2006.01)
*G06T 7/593* (2017.01)
*G06T 7/11* (2017.01)
*G06T 7/136* (2017.01)
*G02B 27/00* (2006.01)
*G06T 7/70* (2017.01)
*G06T 7/194* (2017.01)
*H04N 13/344* (2018.01)
*H04N 13/239* (2018.01)
*H04N 13/398* (2018.01)

(52) U.S. Cl.
CPC ............... *G06T 7/11* (2017.01); *G06T 7/136* (2017.01); *G06T 7/194* (2017.01); *G06T 7/593* (2017.01); *G06T 7/70* (2017.01); *H04N 13/239* (2018.05); *H04N 13/344* (2018.05); *H04N 13/398* (2018.05); *G02B 2027/014* (2013.01); *G02B 2027/0134* (2013.01); *G02B 2027/0138* (2013.01); *G02B 2027/0178* (2013.01); *G06T 2207/10012* (2013.01)

(58) Field of Classification Search
CPC . H04N 7/15; G06T 7/194; G06T 2207/10028; G06T 7/11
See application file for complete search history.

(56) References Cited

U.S. PATENT DOCUMENTS

| | | | | |
|---|---|---|---|---|
| 6,591,008 B1* | 7/2003 | Surve | ...................... | G06T 5/001 348/62 |
| 6,611,618 B1* | 8/2003 | Peli | ........................... | G06T 5/10 345/632 |
| 8,130,263 B2* | 3/2012 | Chang | .................. | G02B 27/017 348/53 |
| 8,311,328 B2* | 11/2012 | Spruck | ..................... | G06K 9/38 382/172 |
| 8,937,646 B1* | 1/2015 | Baldwin | ................. | H04N 5/262 348/47 |
| 9,063,352 B2* | 6/2015 | Ford | ........................ | G02C 7/04 |
| 2004/0013314 A1* | 1/2004 | Peli | ........................... | G06T 5/10 382/254 |
| 2004/0136570 A1* | 7/2004 | Ullman | ................... | G06T 5/004 382/114 |
| 2011/0090311 A1* | 4/2011 | Fang | ........................ | H04N 7/15 348/43 |
| 2011/0164122 A1* | 7/2011 | Hardacker | ......... | H04N 13/0425 348/53 |

FOREIGN PATENT DOCUMENTS

| | | |
|---|---|---|
| EP | 3286914 A1 | 2/2018 |
| JP | H07-200632 A | 8/1995 |
| JP | 2001-169308 A | 6/2001 |
| JP | 2013117608 A | 6/2013 |
| JP | 2013135341 A | 7/2013 |
| JP | 2013162453 A | 8/2013 |
| JP | 2014-197824 A | 10/2014 |
| WO | 2014/103732 A | 7/2014 |
| WO | 2014/128750 A1 | 8/2014 |
| WO | 2016/172125 A1 | 10/2016 |

OTHER PUBLICATIONS

Japanese Office dated Oct. 15, 2019 for corresponding Japanese Application No. 2015-089983.
Chinese Office Action dated Dec. 10, 2020 for corresponding Chinese Application No. 2016800236736.
European Patent Office communication Pursuant to Article 94(3) EPC dated Feb. 15, 2021 for corresponding European Application No. 16724979.6.
Feng Li, "A Hybrid Camera System for Low-Light Imaging", Dissertation, Dec. 31, 2011 (Dec. 31, 2011), pp. 1-119, XP055503409, us ISBN: 978-1-267-21501-7 Retrieved from the Internet: URL: https ://fli1a.files.wordpress.com/2014/07 /dissertation-lowlight. pdf.

* cited by examiner

[Fig. 1]
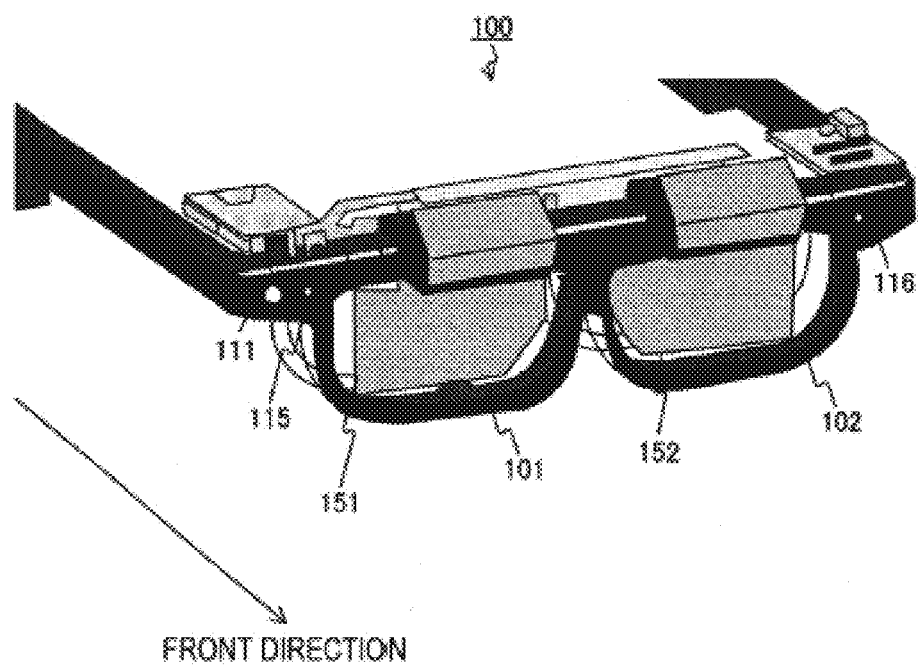

[Fig. 2]
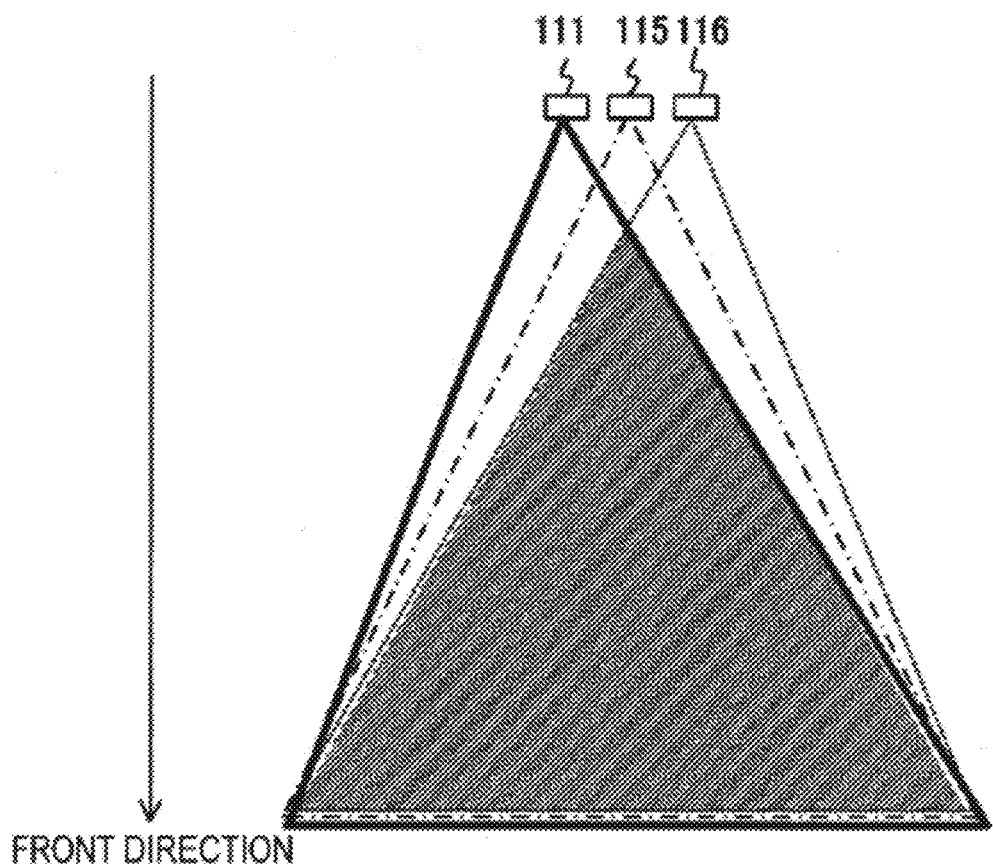

[Fig. 3]
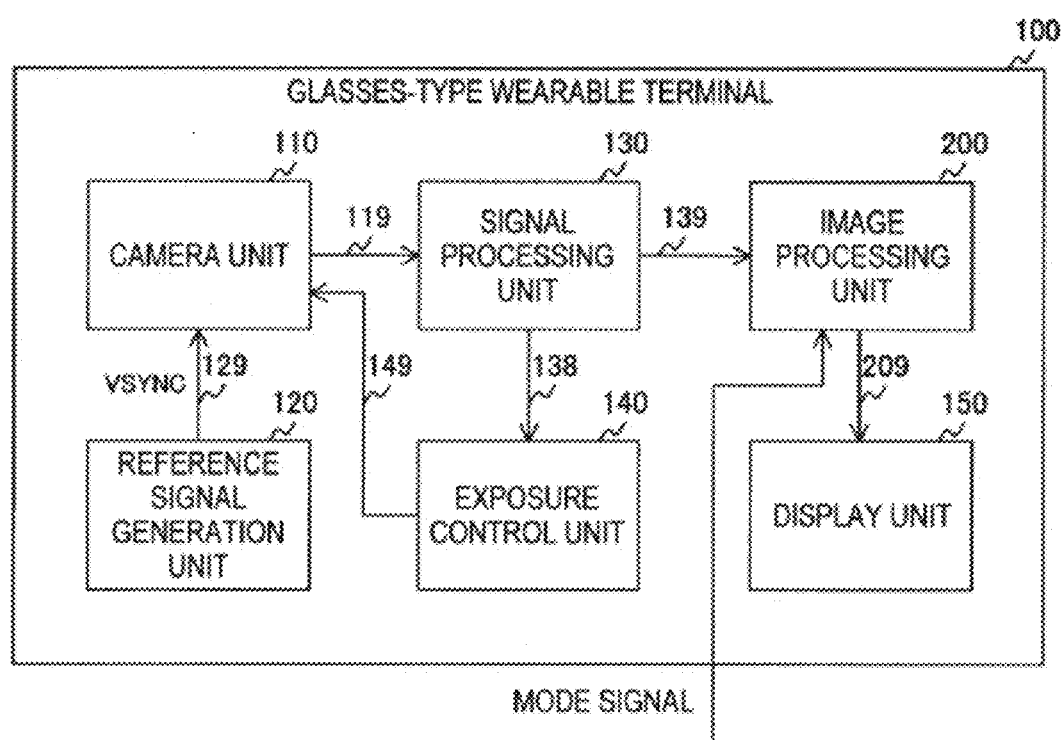

[Fig. 4]
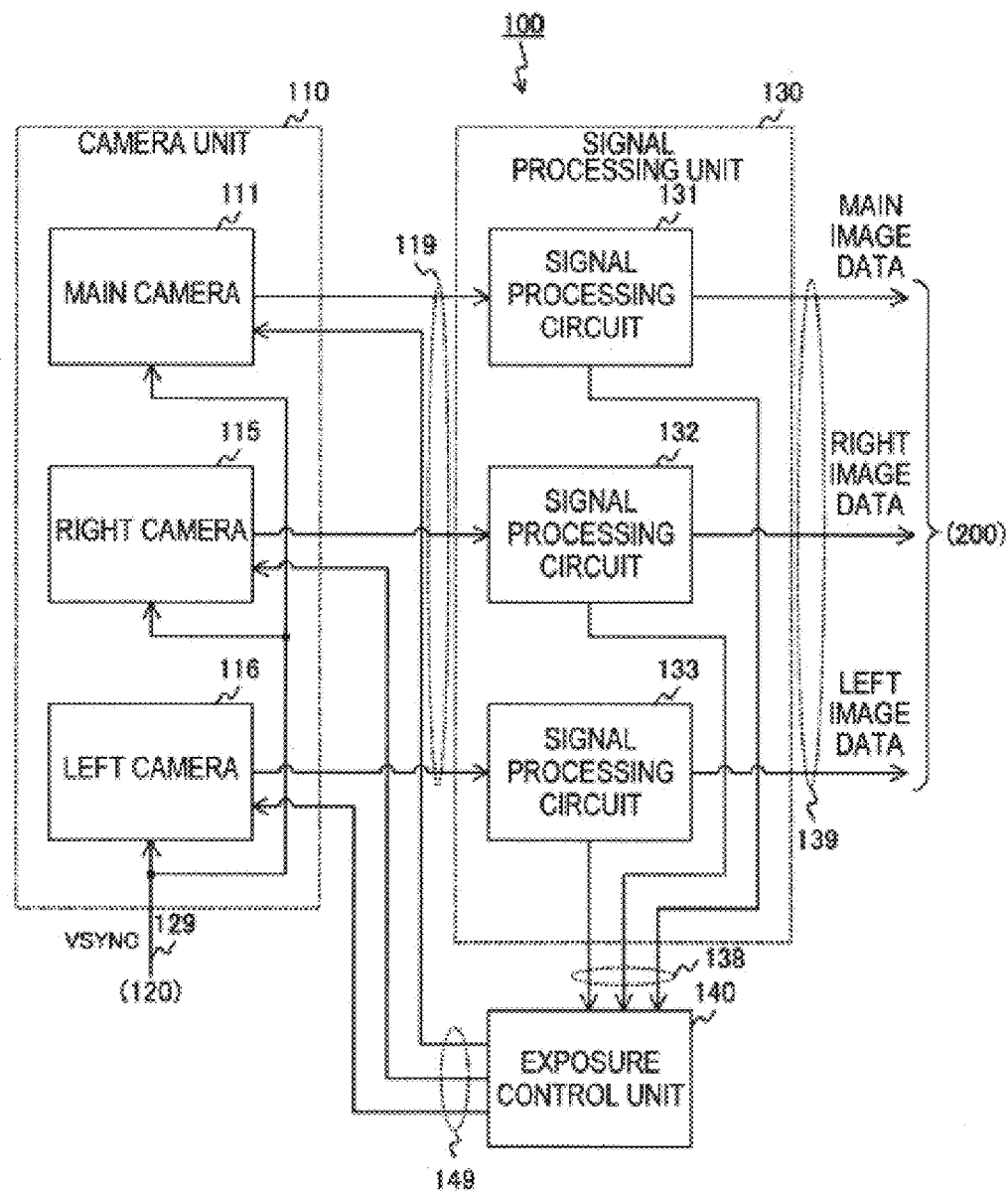

[Fig. 5]
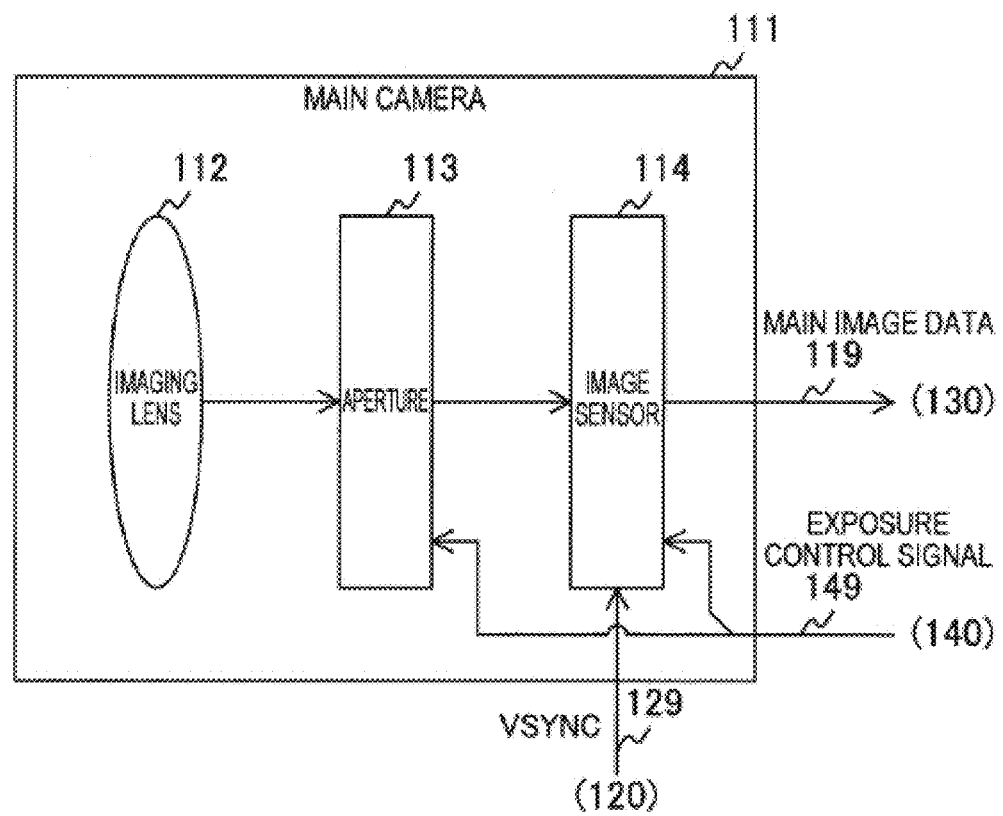

[Fig. 6]
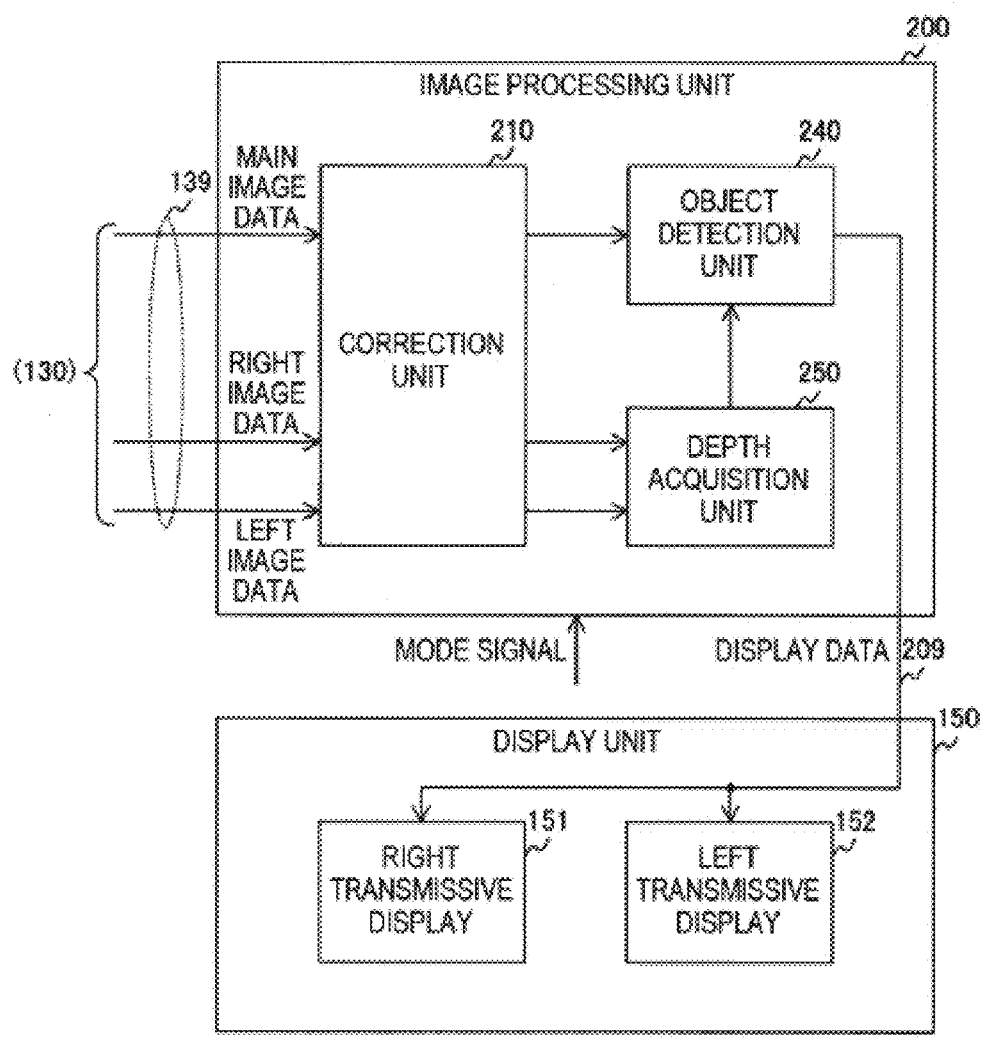

[Fig. 7]
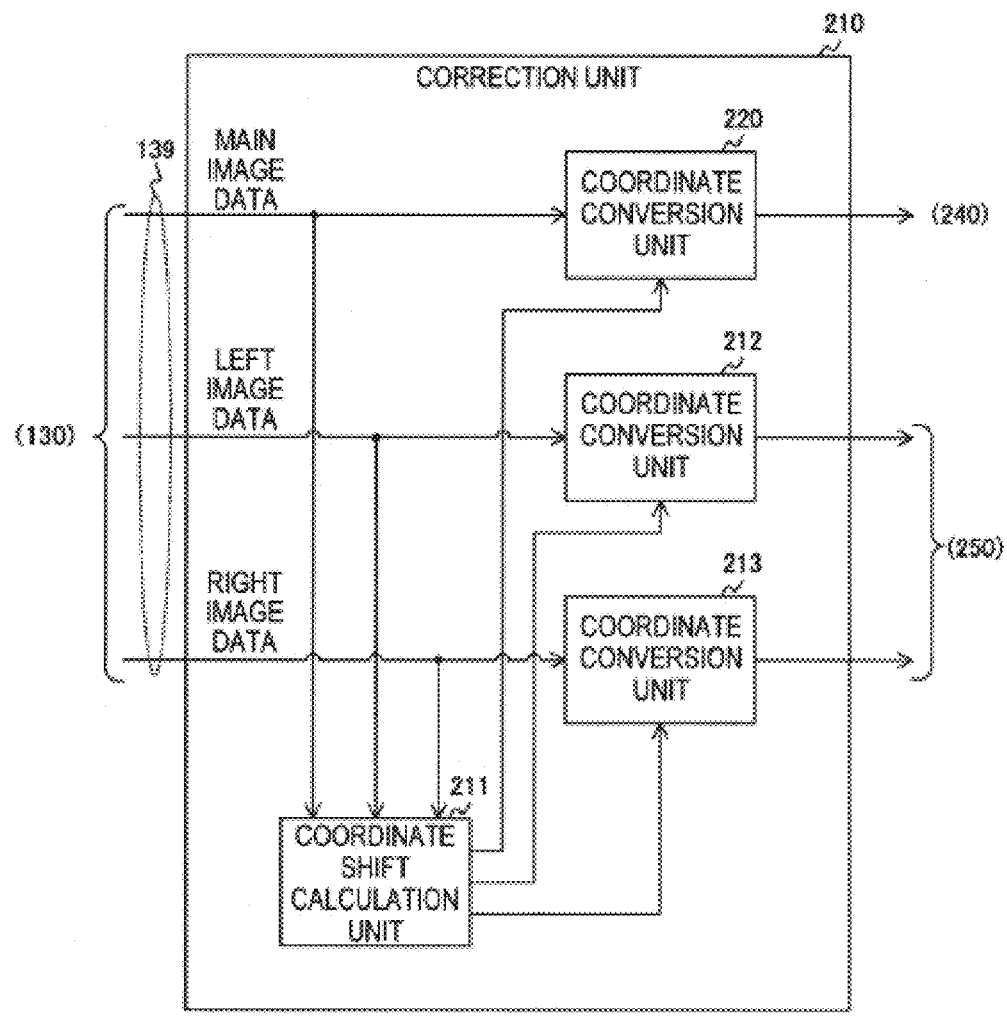

[Fig. 8]
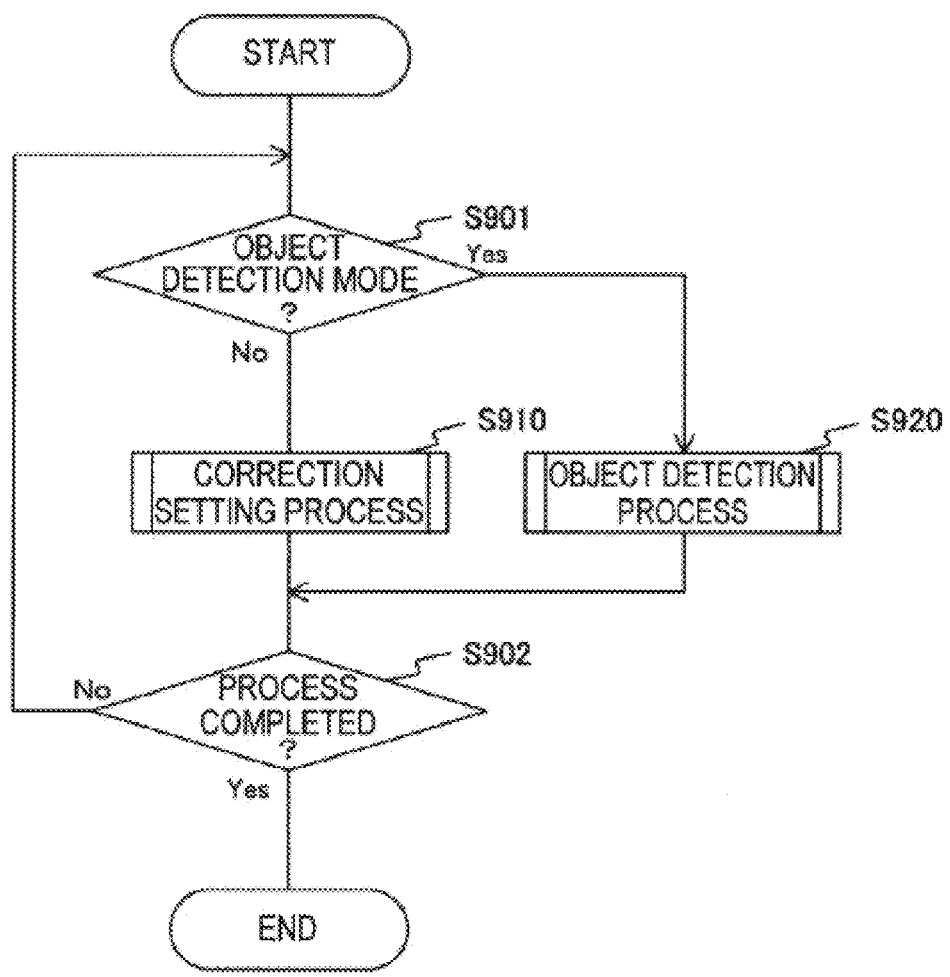

[Fig. 9]
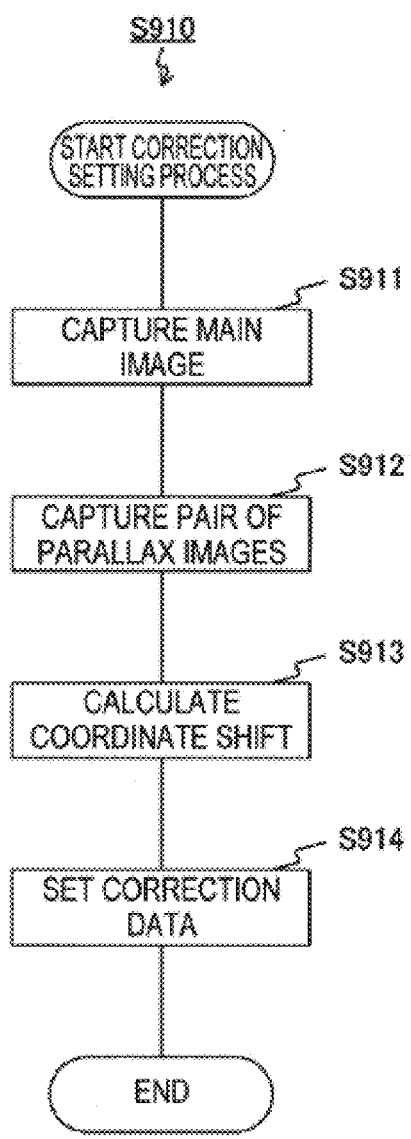

[Fig. 10]
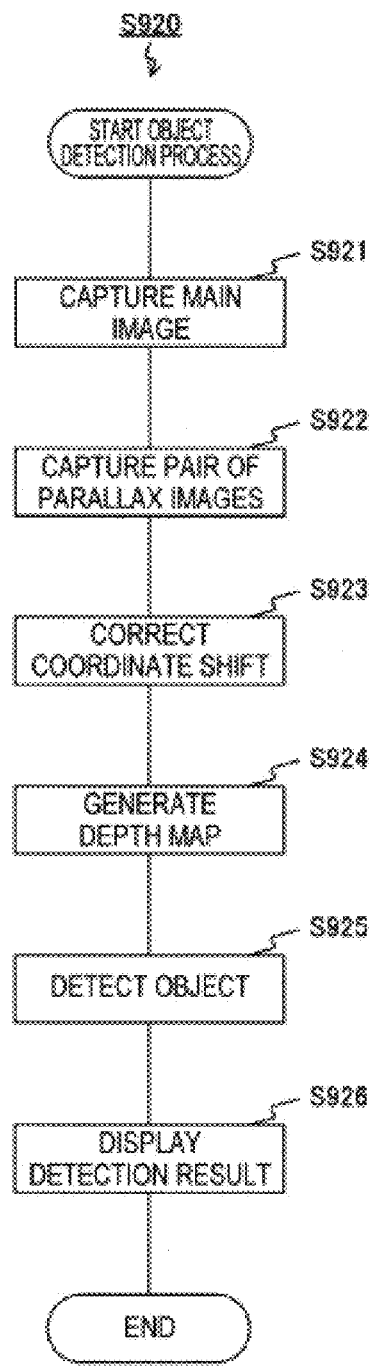

[Fig. 11]
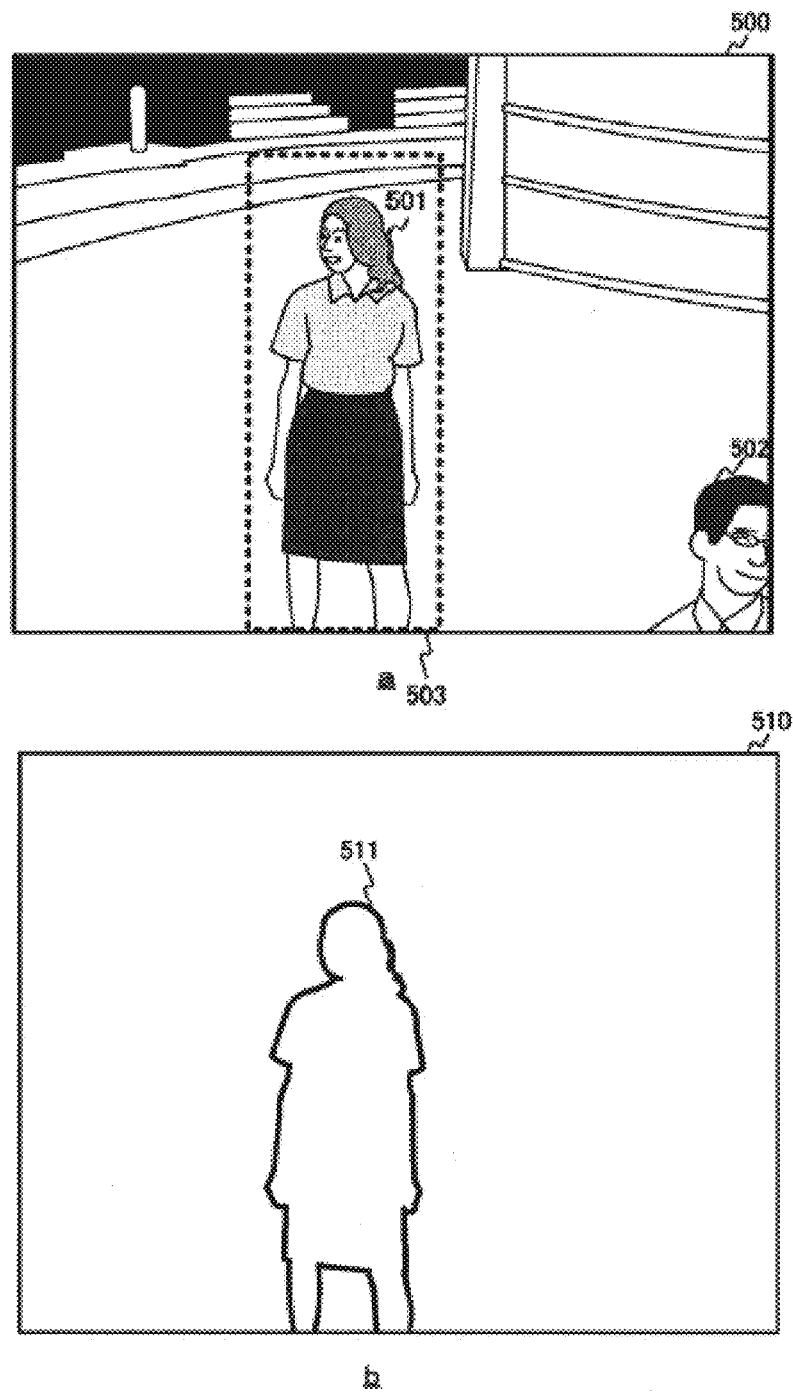

[Fig. 12]
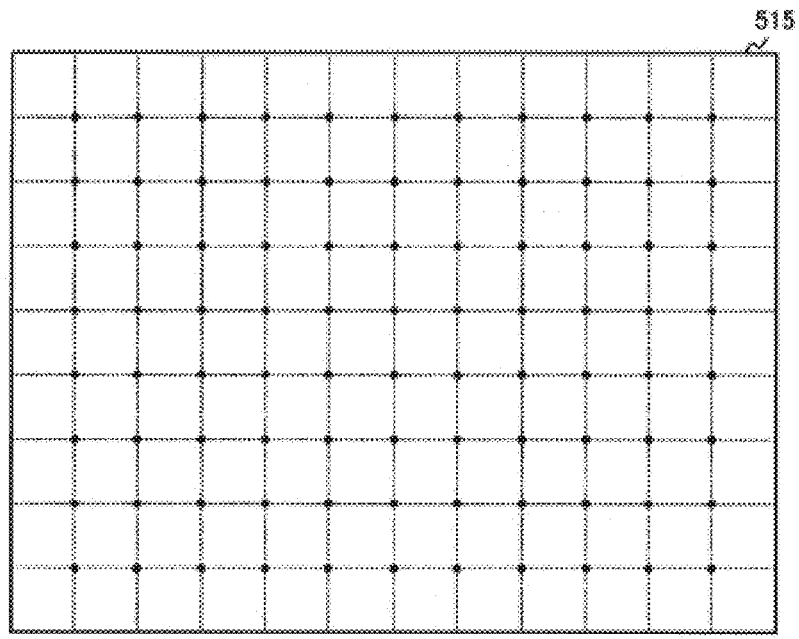
a
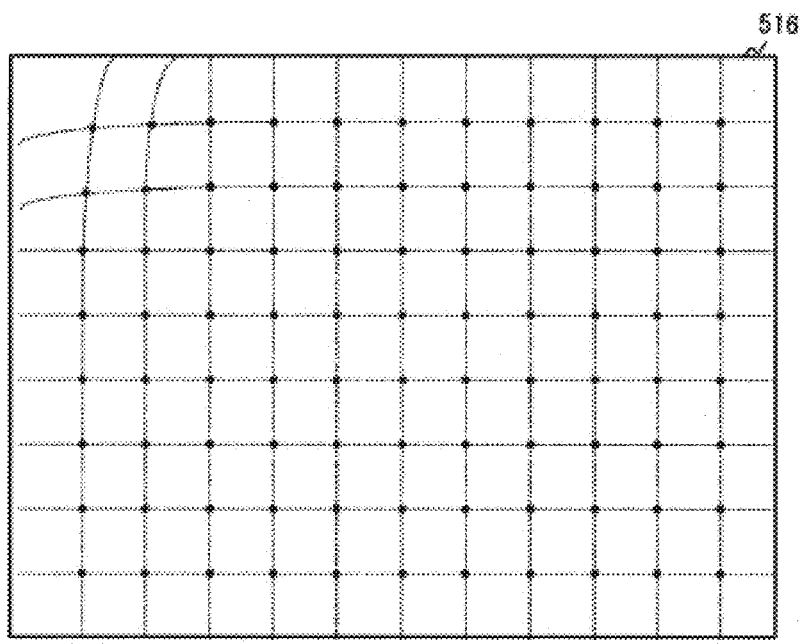
b

[Fig. 13]
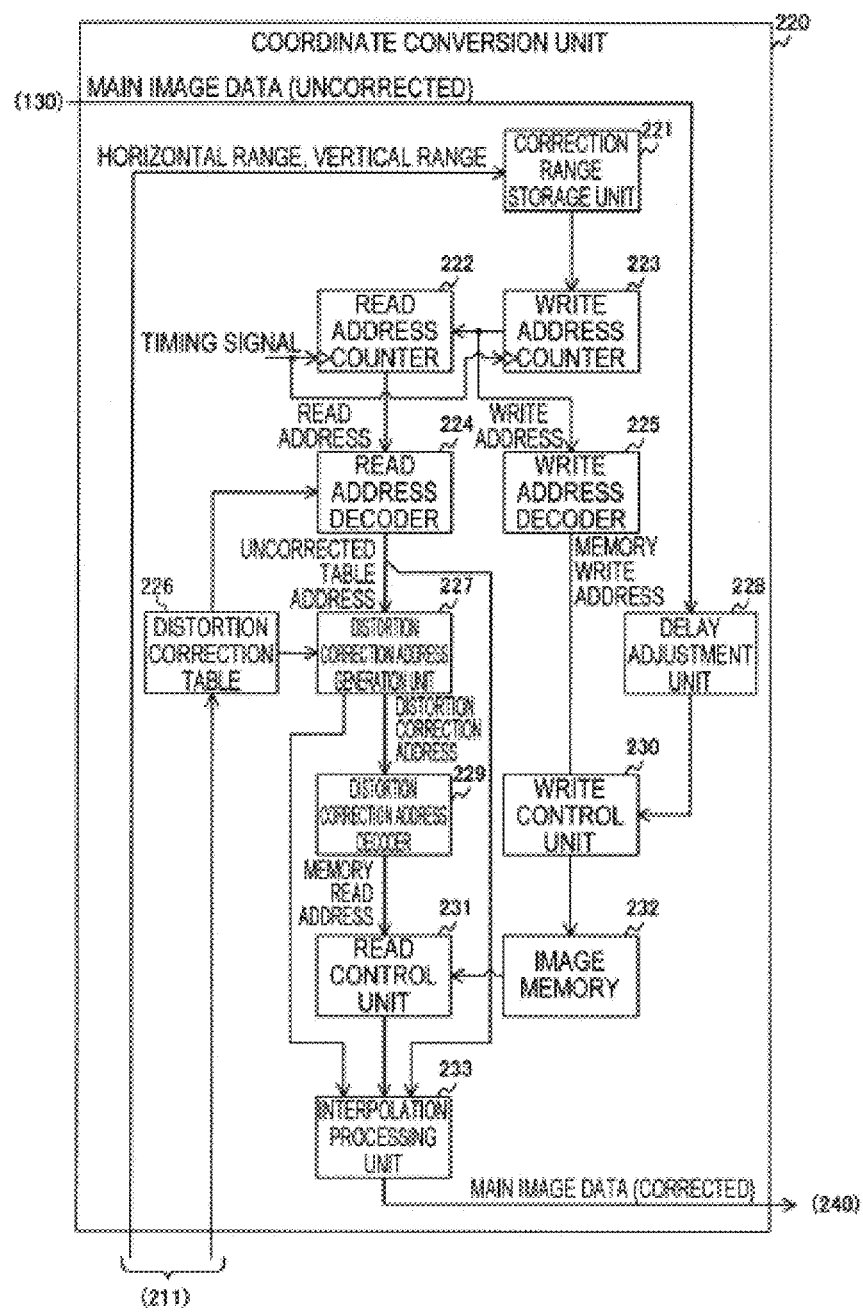

[Fig. 14]
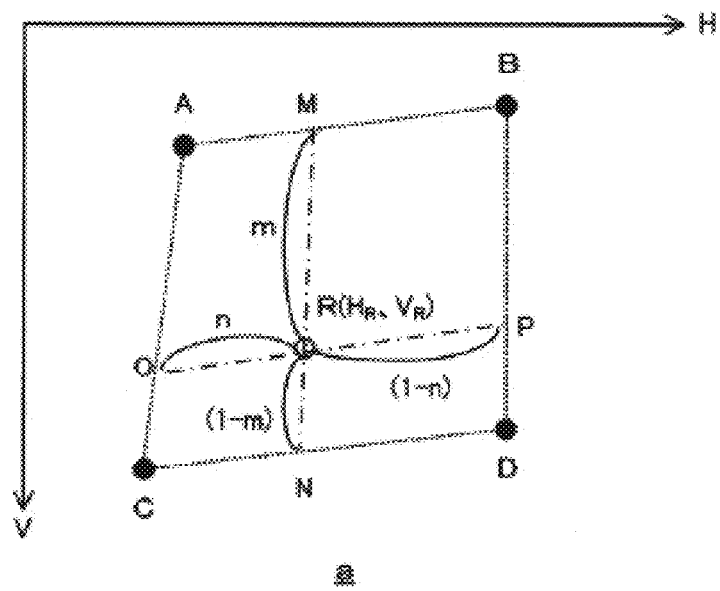
a
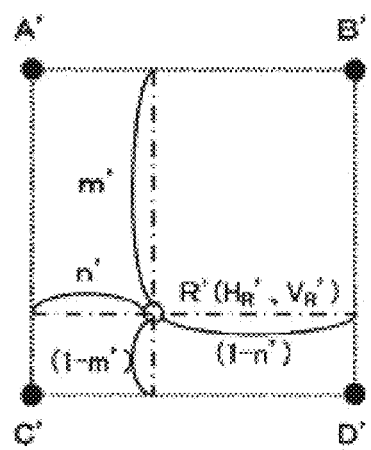
b

[Fig. 15]
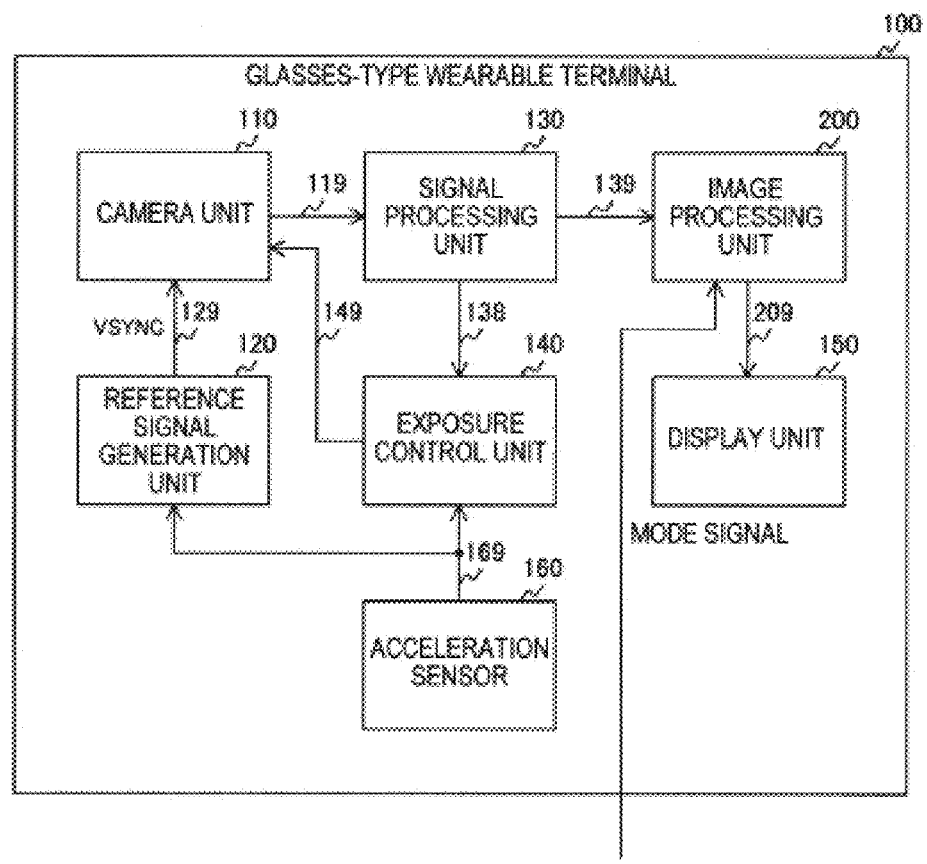

[Fig. 16]
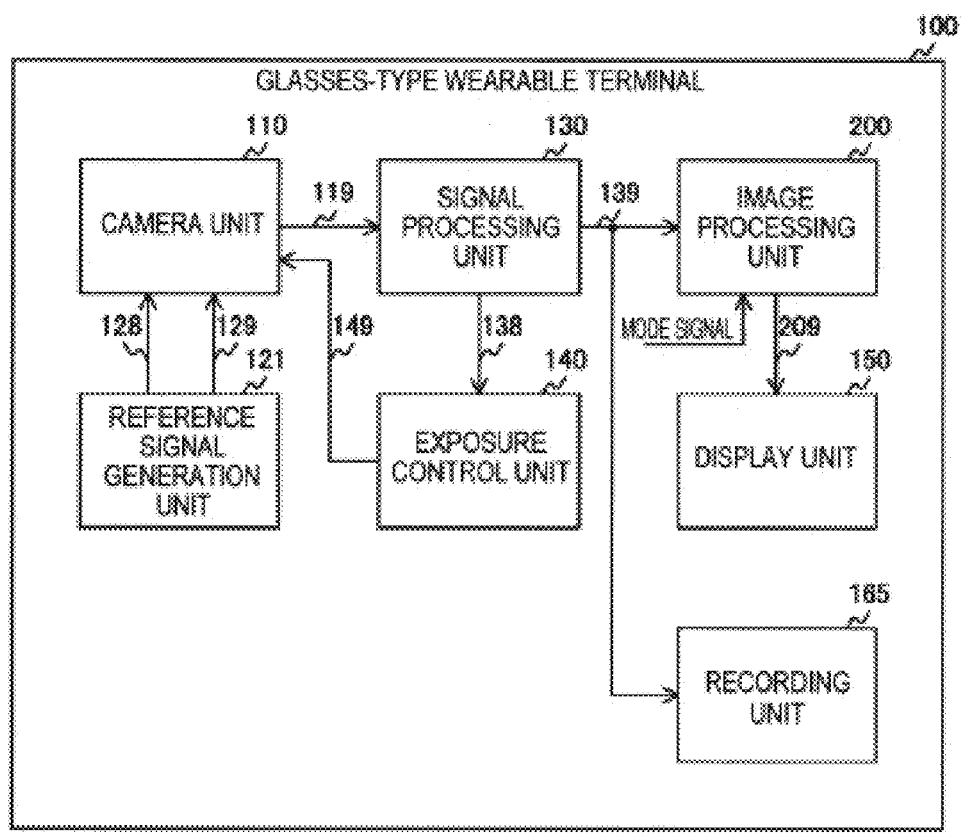

[Fig. 17]
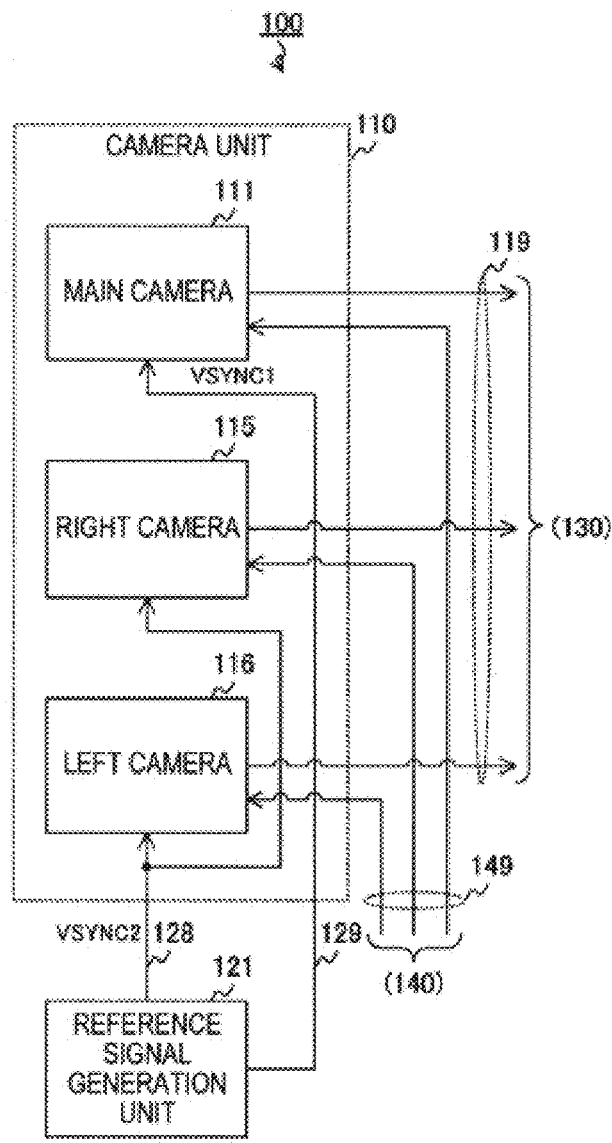

[Fig. 18]
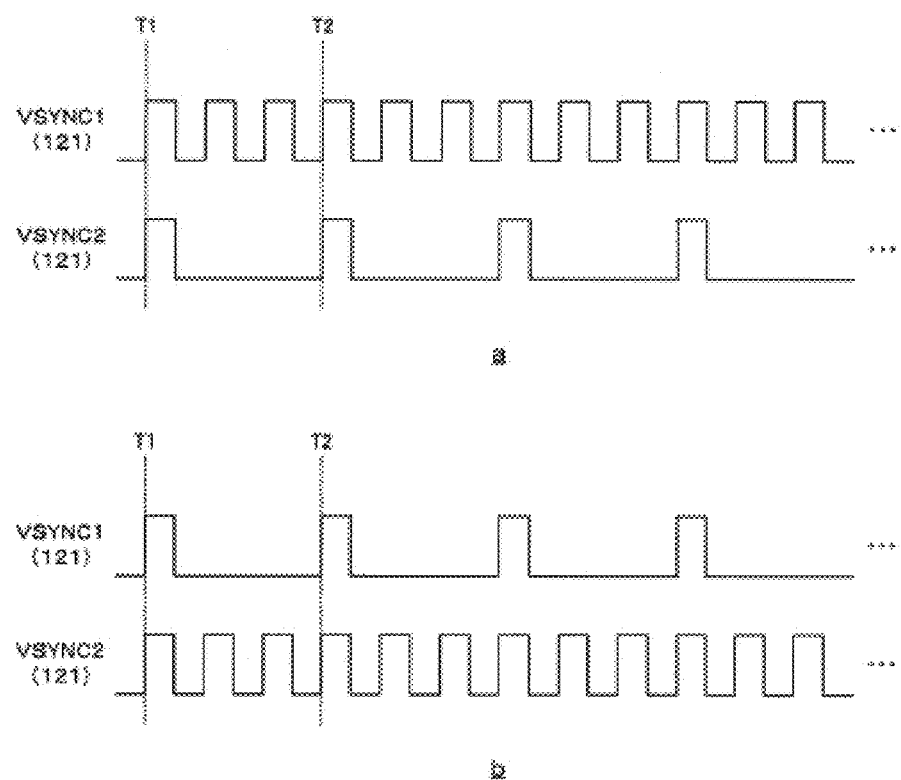

[Fig. 19]
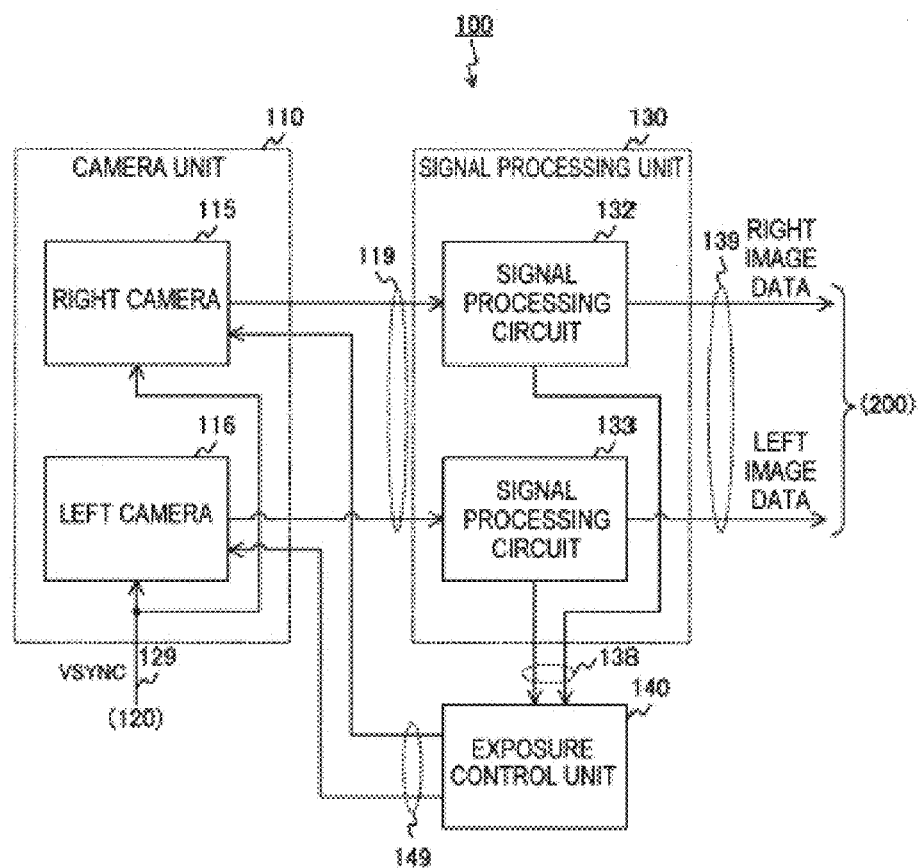

[Fig. 20]
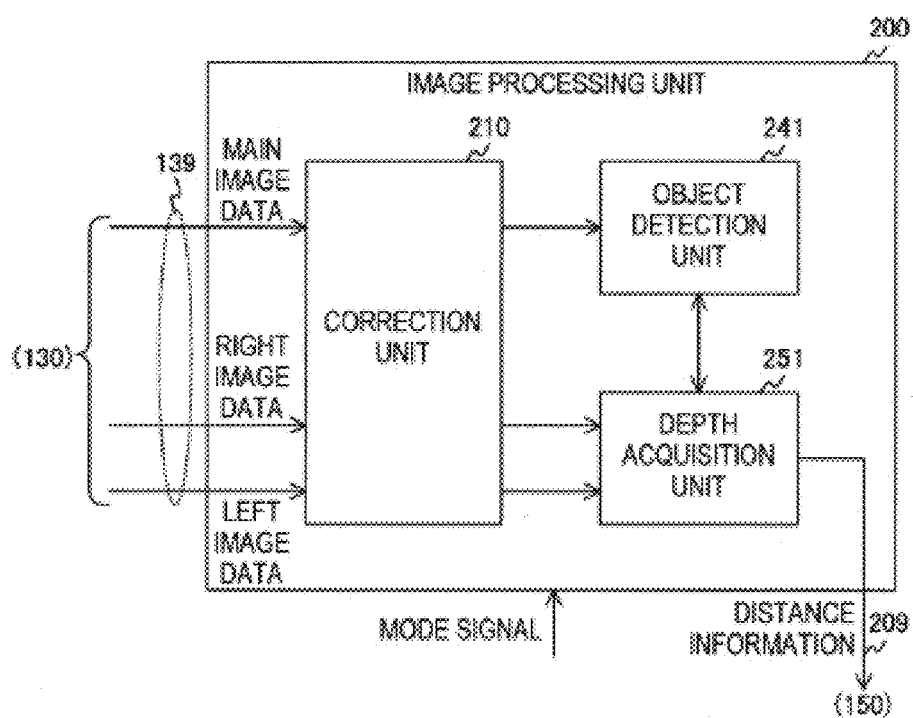

[Fig. 21]
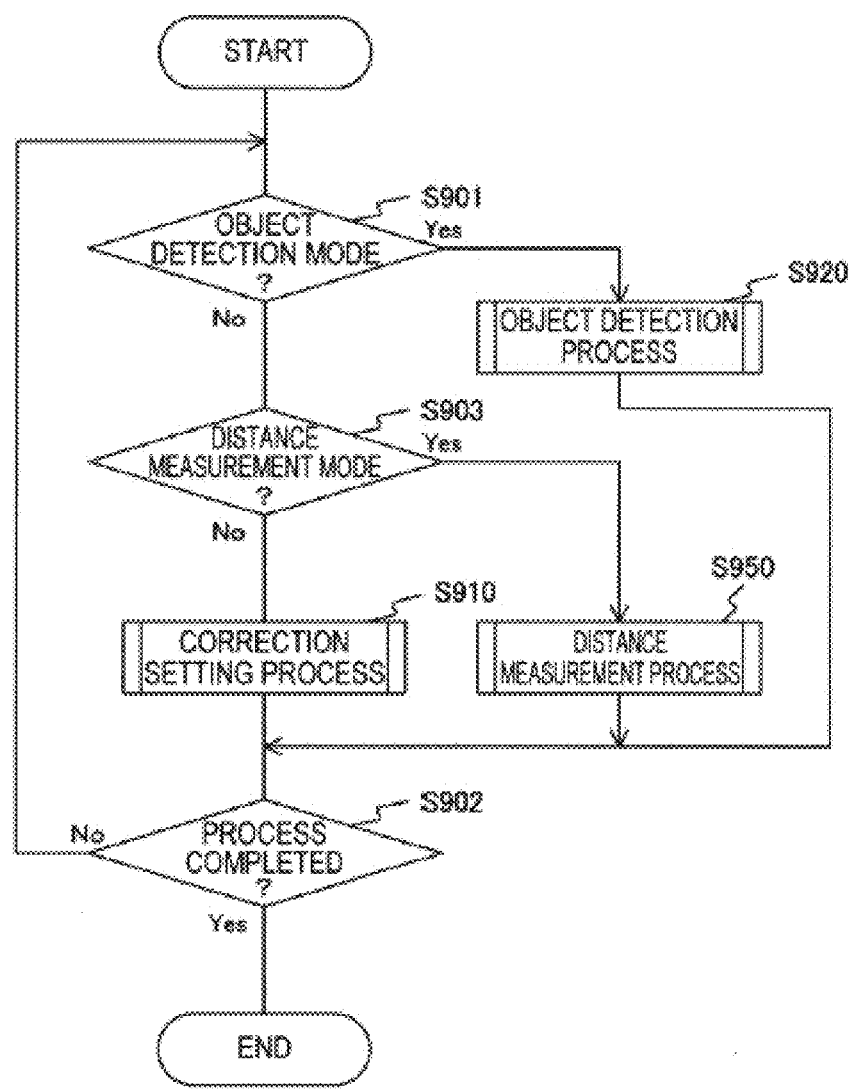

[Fig. 22]
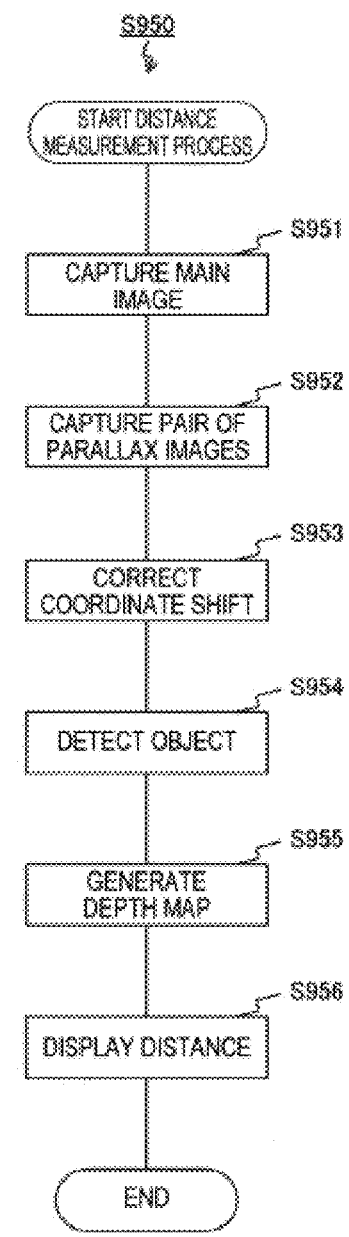

[Fig. 23]
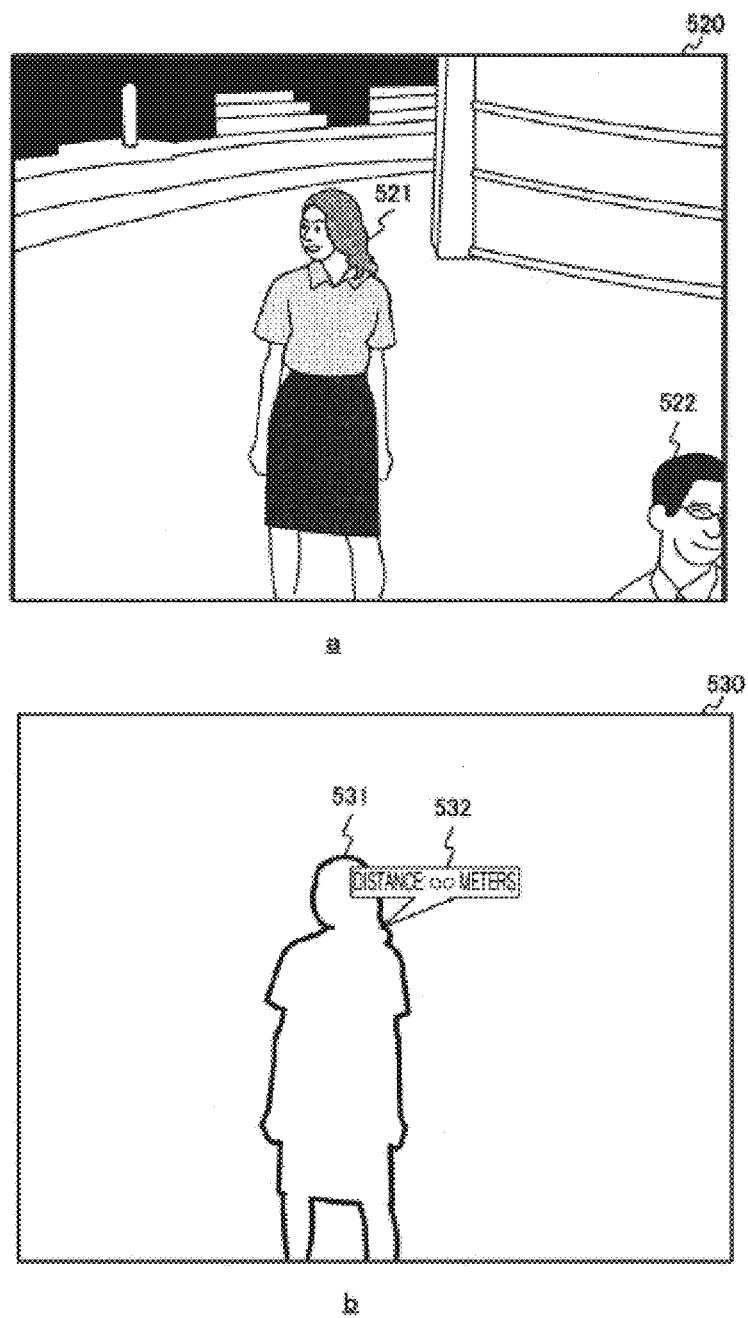

[Fig. 24]
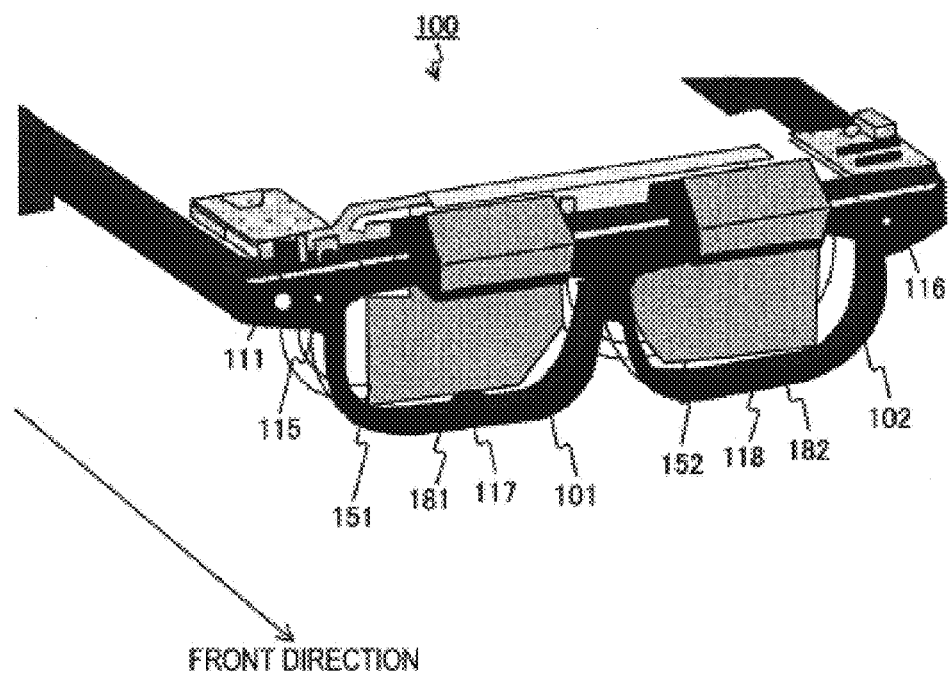

[Fig. 25]
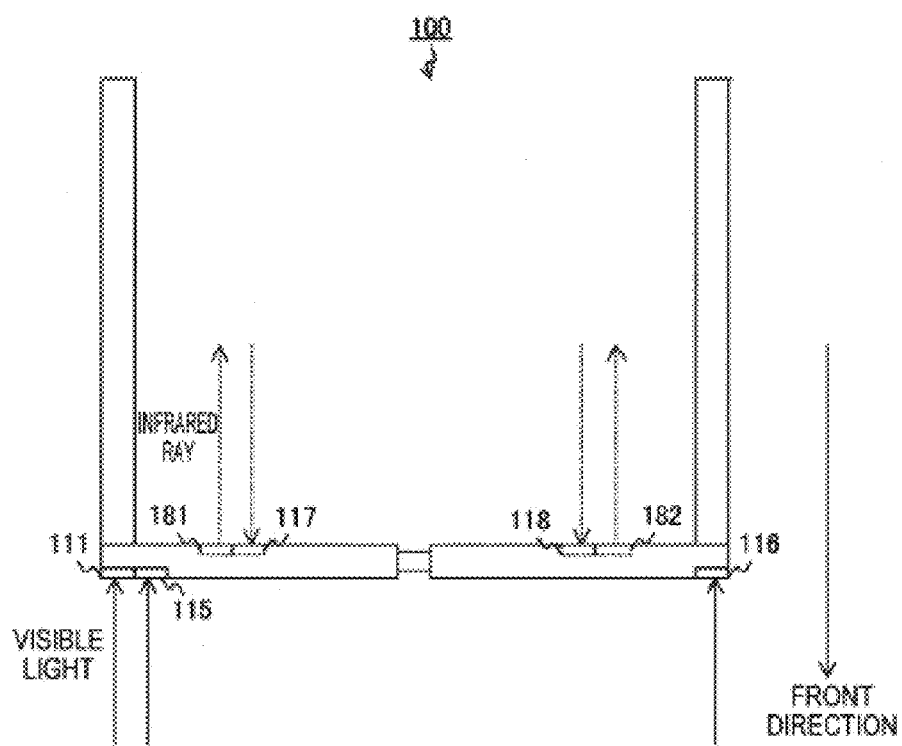

[Fig. 26]
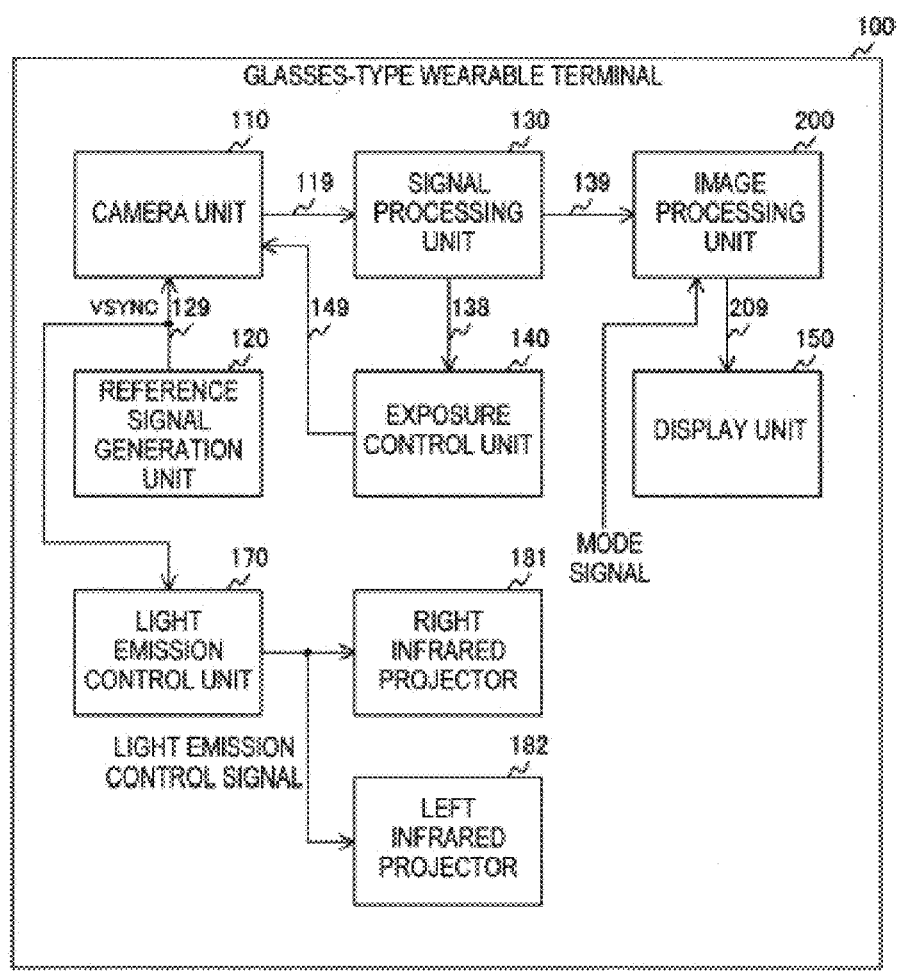

[Fig. 27]
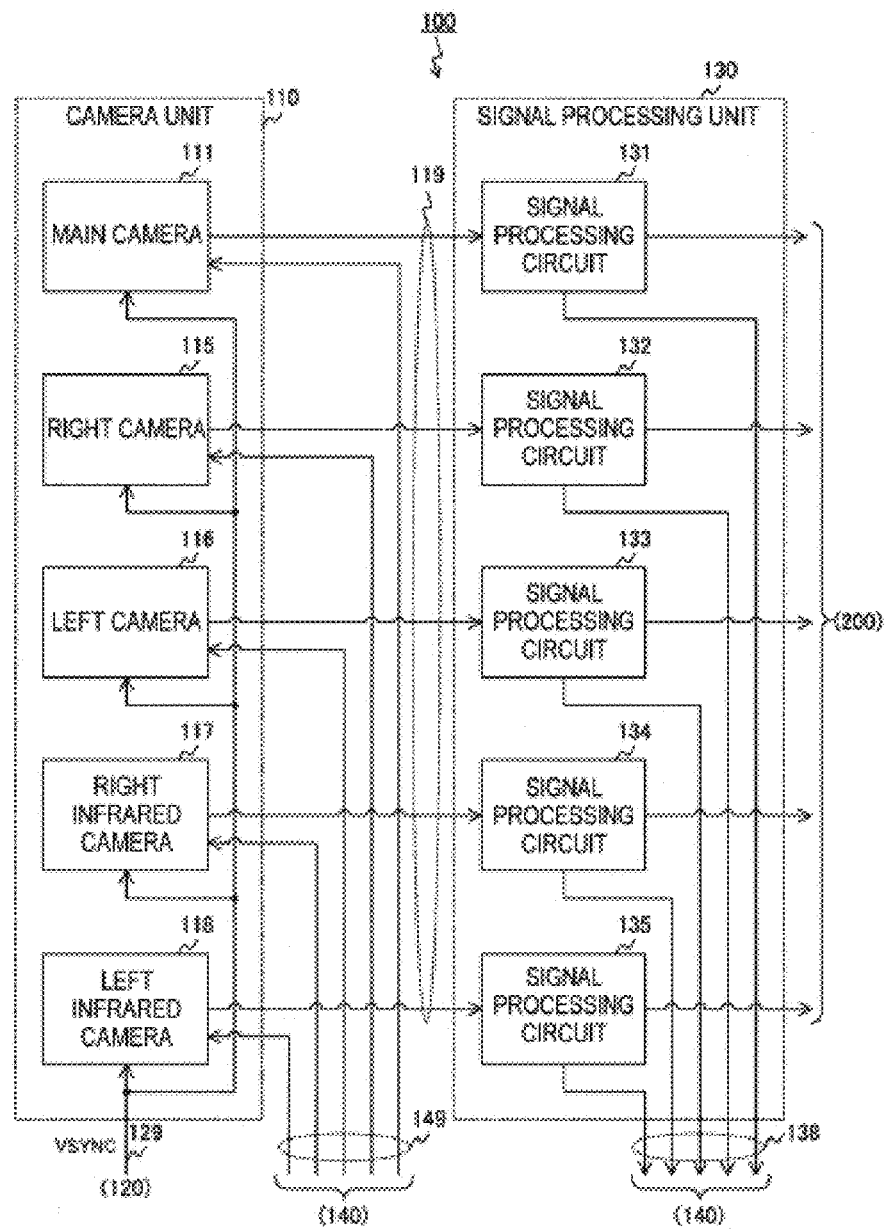

[Fig. 28]
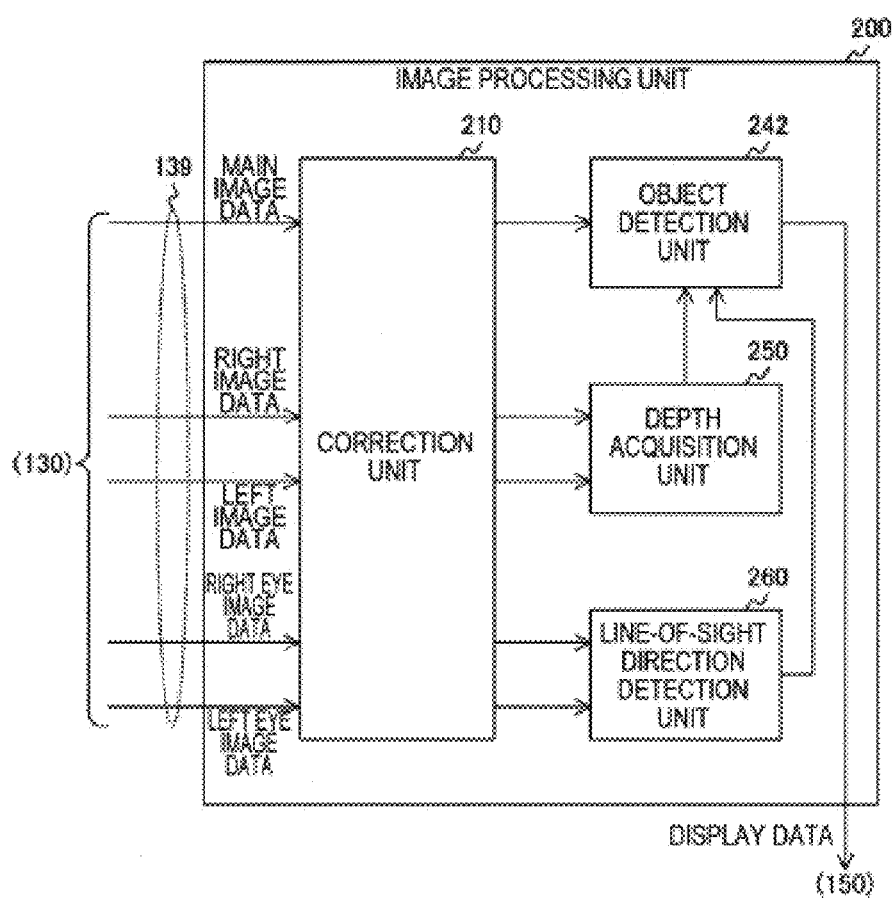

[Fig. 29]
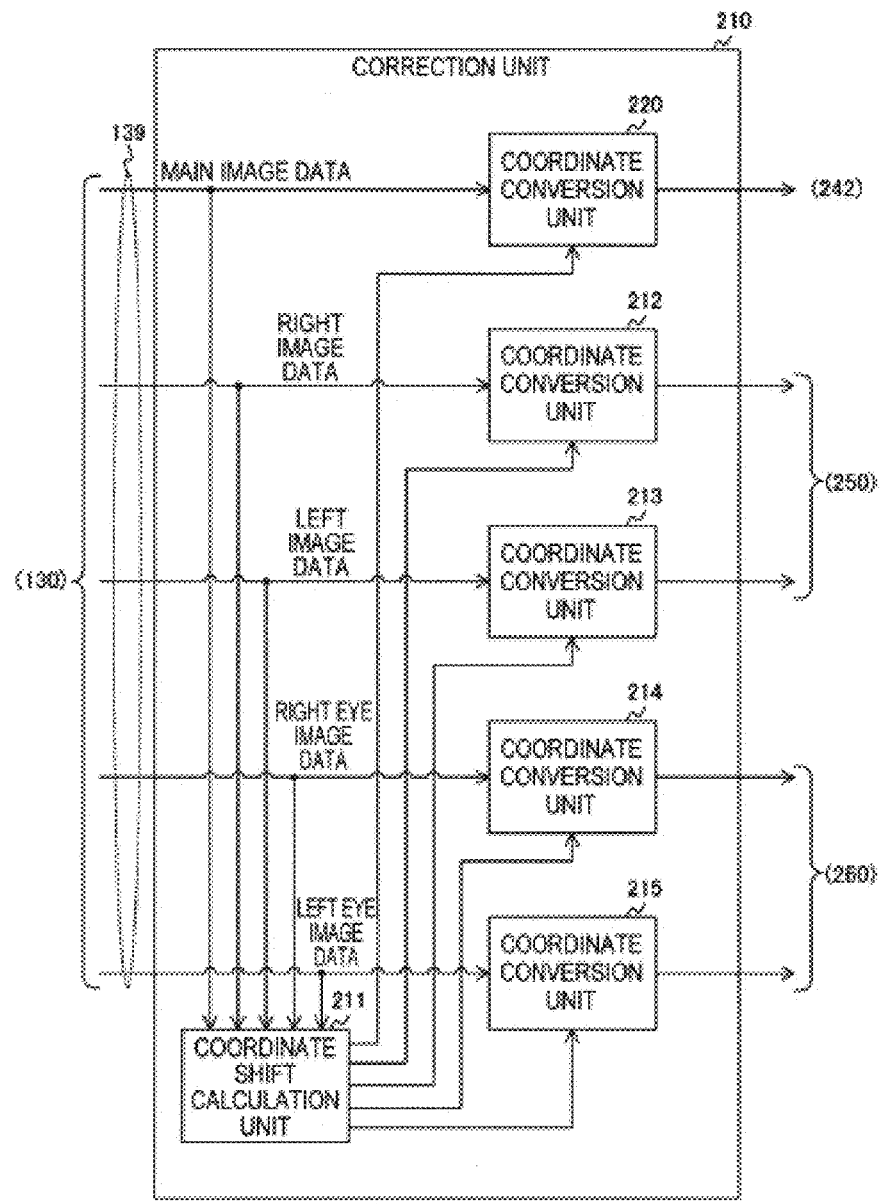

[Fig. 30]
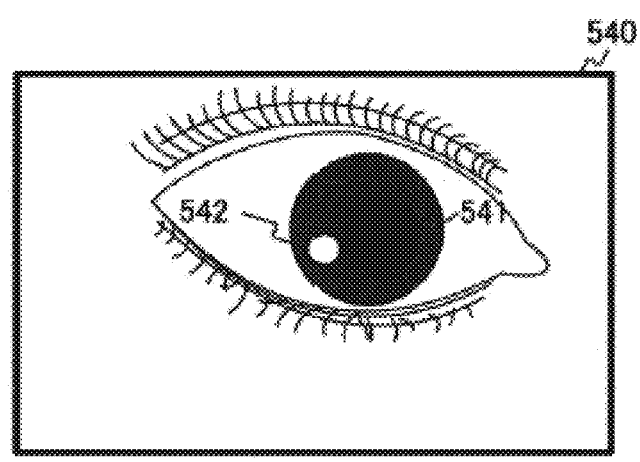
a
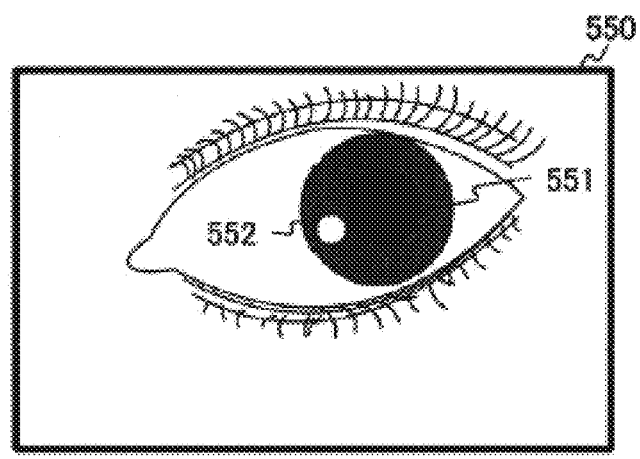
b

[Fig. 31]
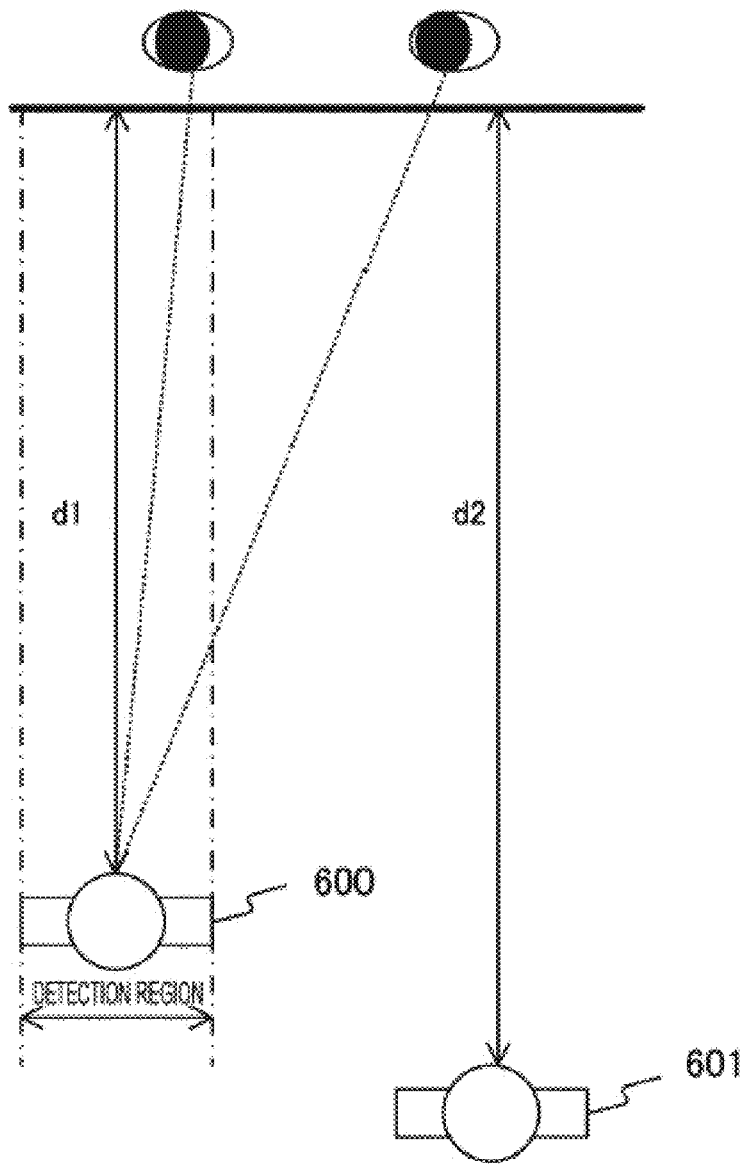

[Fig. 32]
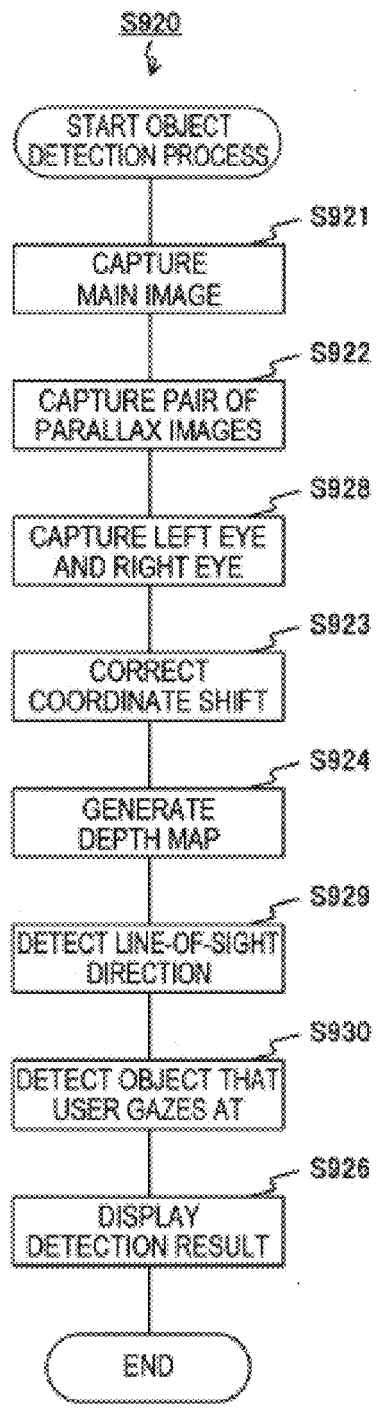

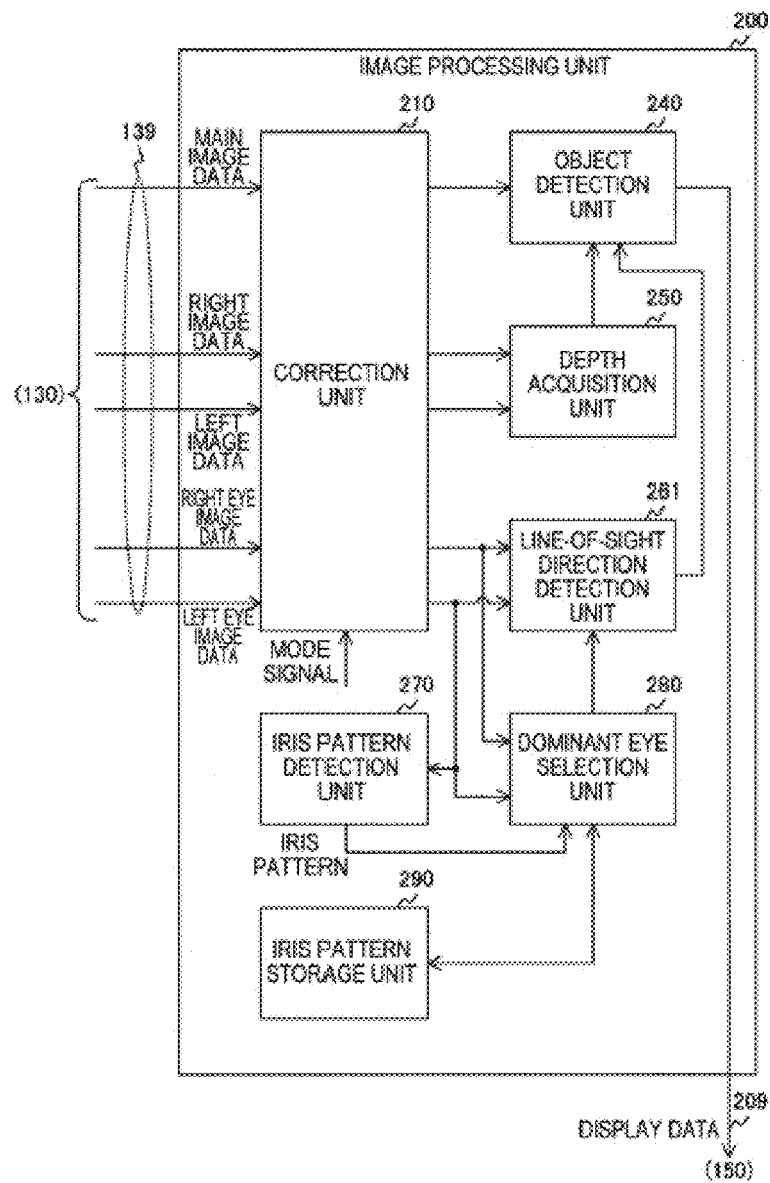
[Fig. 33]

| IDENTIFICATION NUMBER | IRIS PATTERN INFORMATION | DOMINANT EYE INFORMATION |
|---|---|---|
| 1 | PATTERN A | RIGHT EYE |
| 2 | PATTERN B | LEFT EYE |
| 3 | PATTERN C | RIGHT EYE |
| ... | ... | ... |

[Fig.35]
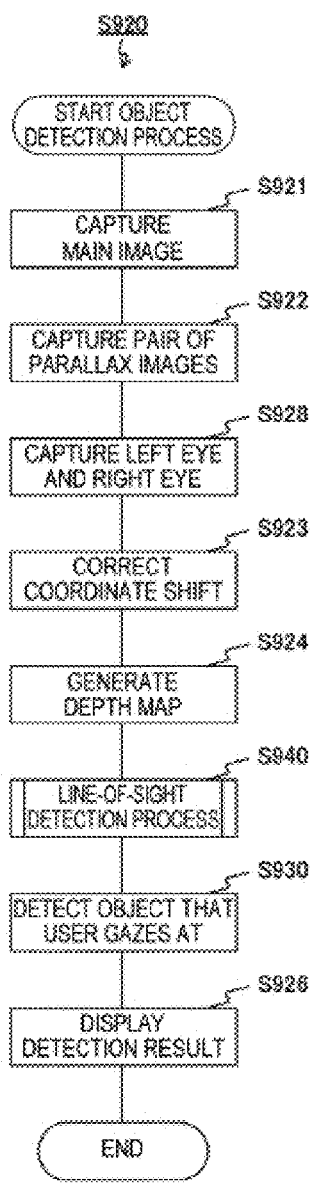

[Fig. 36]
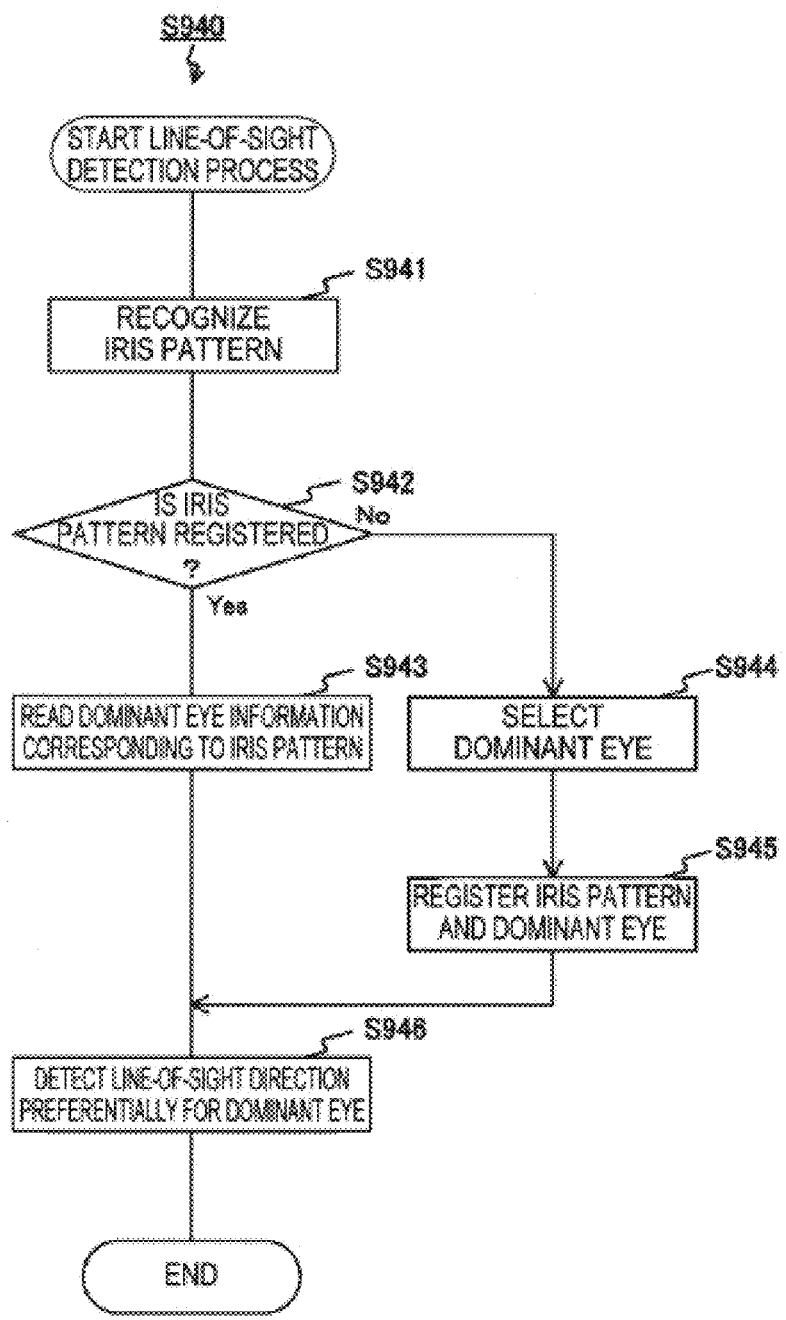

[Fig. 37]
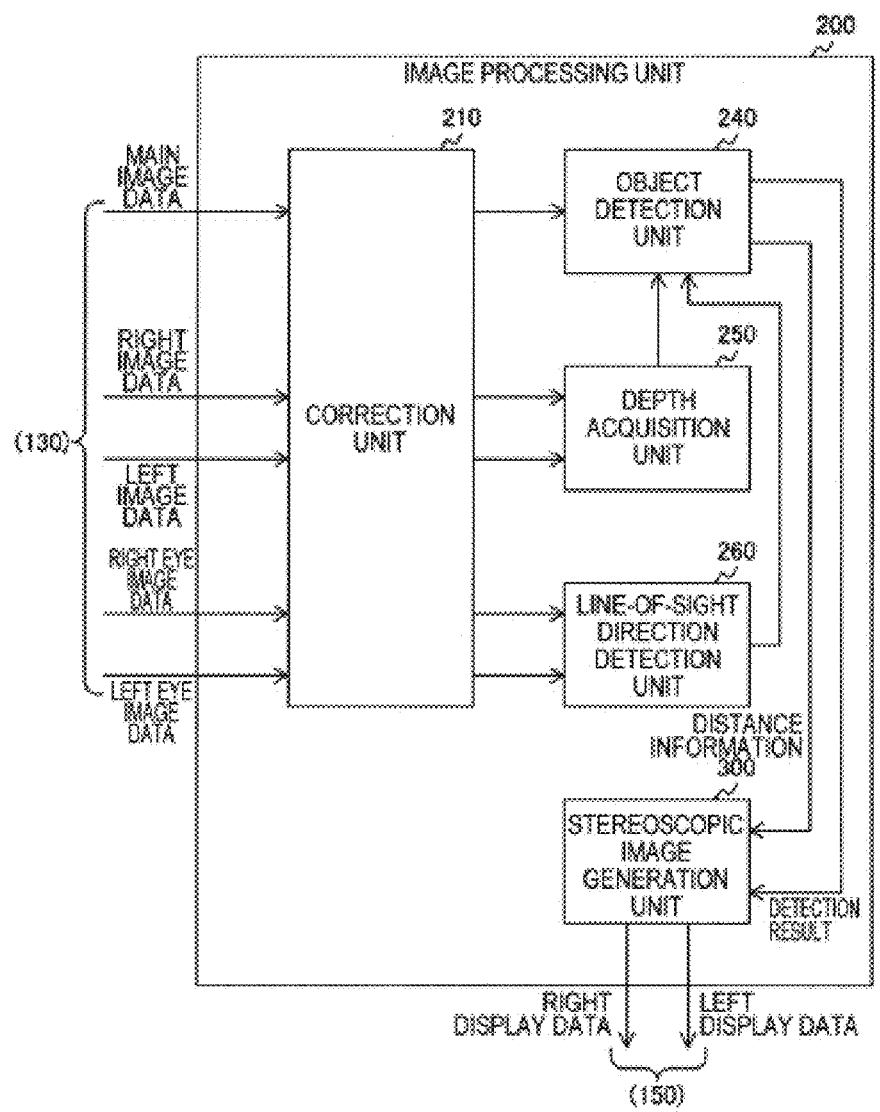

[Fig. 38]
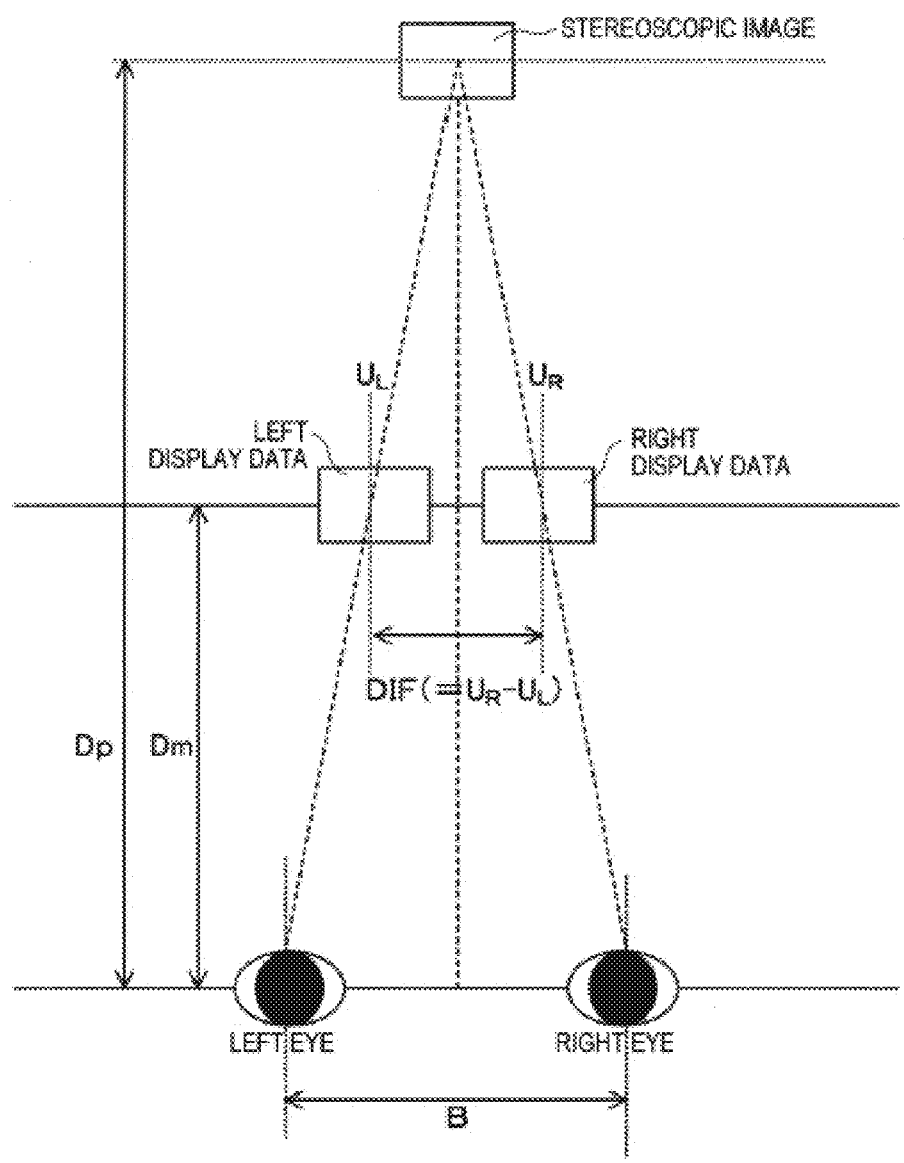

[Fig. 39]
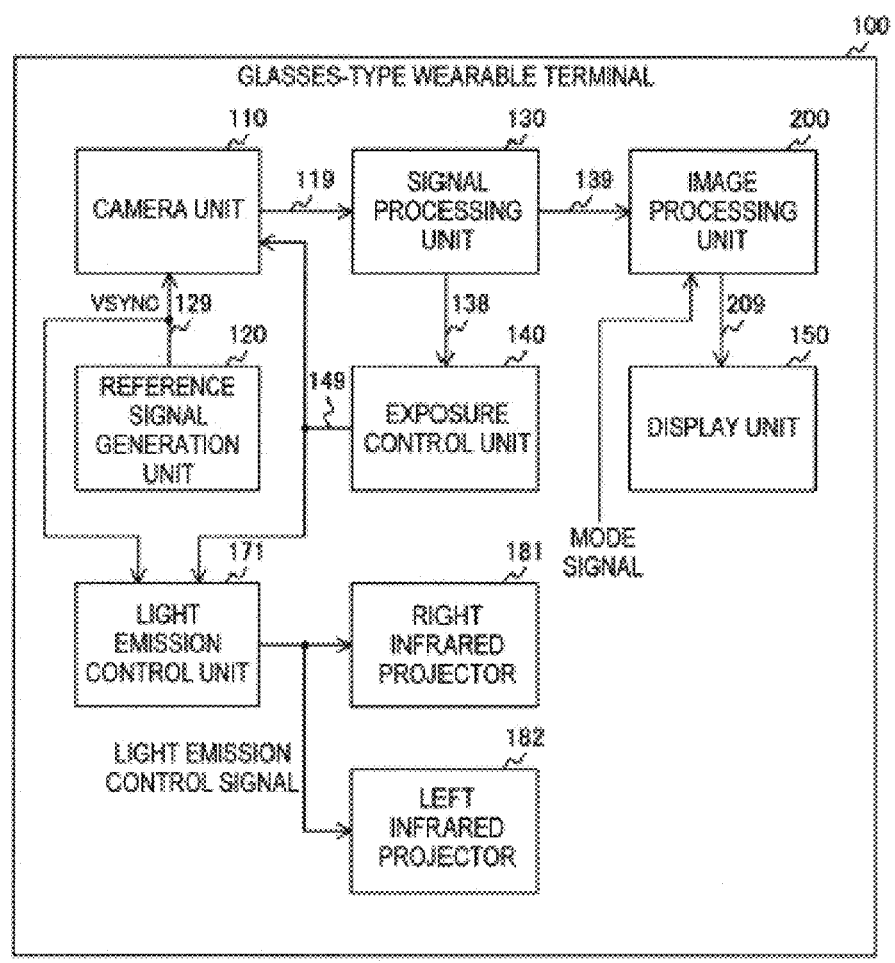

[Fig. 40]
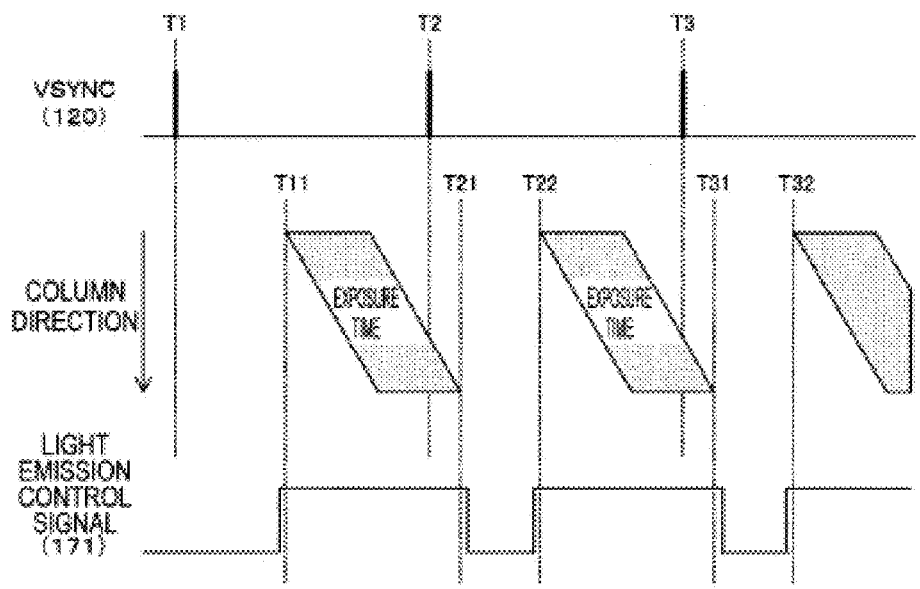
[Fig. 41]
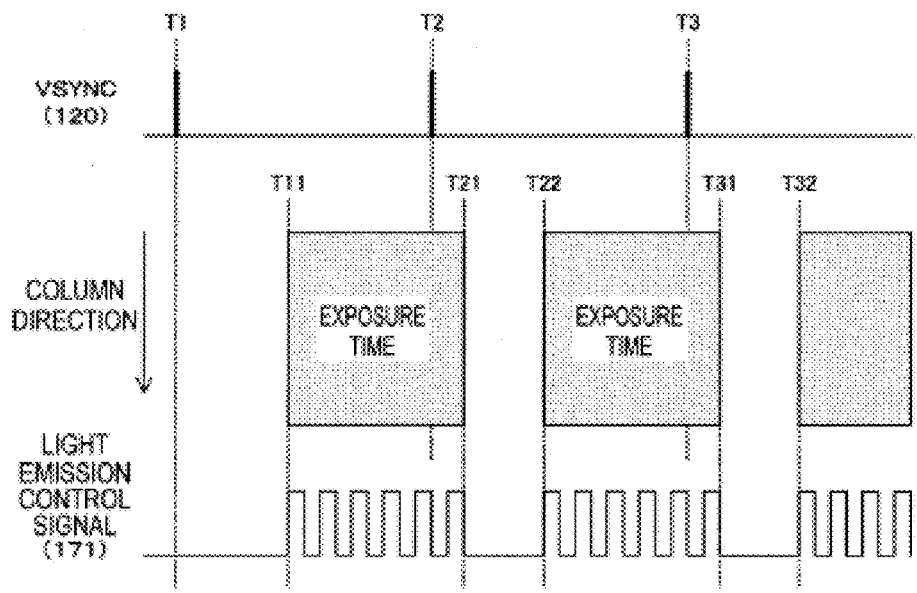

[Fig. 42]
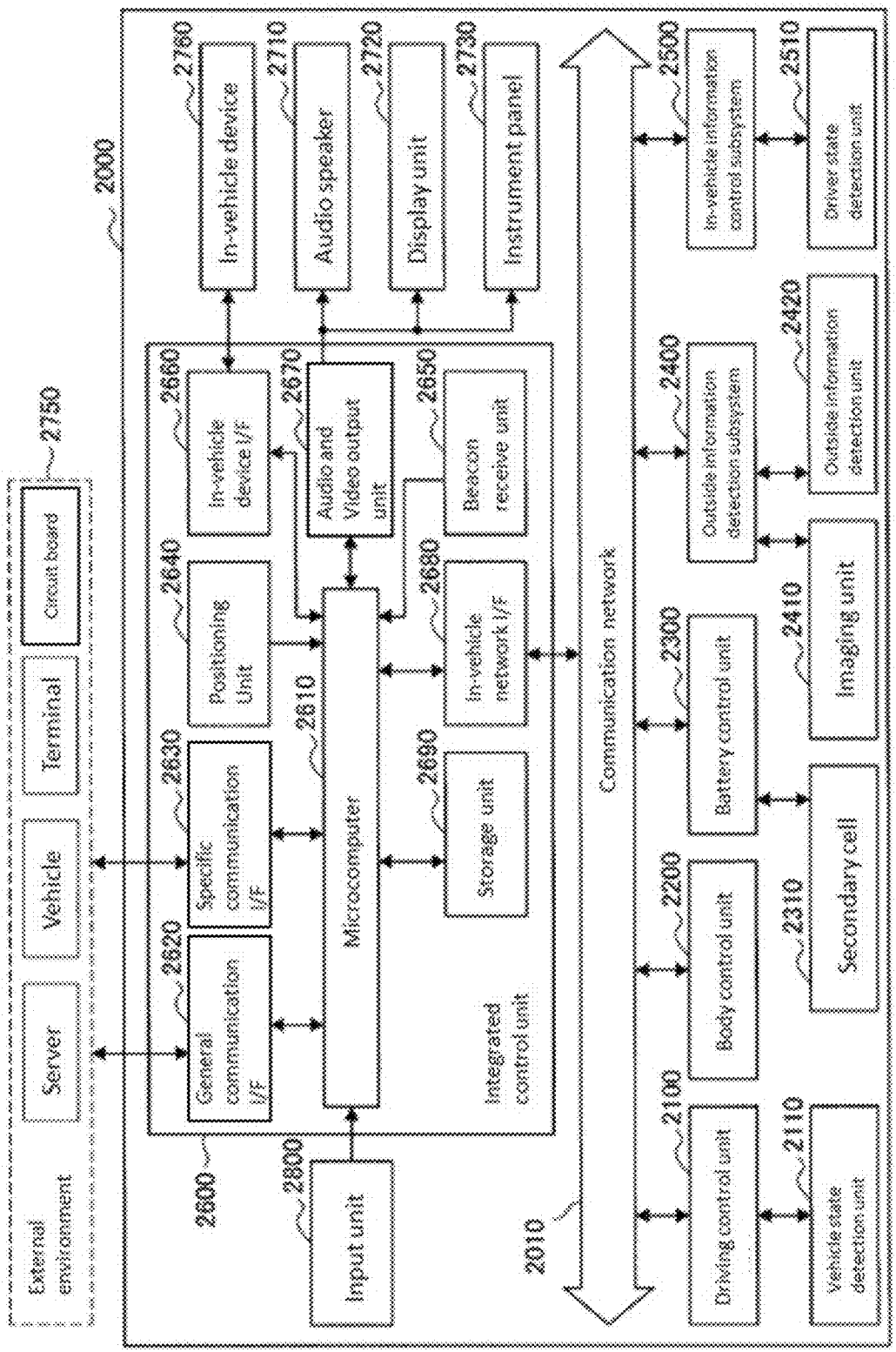

[Fig. 43]
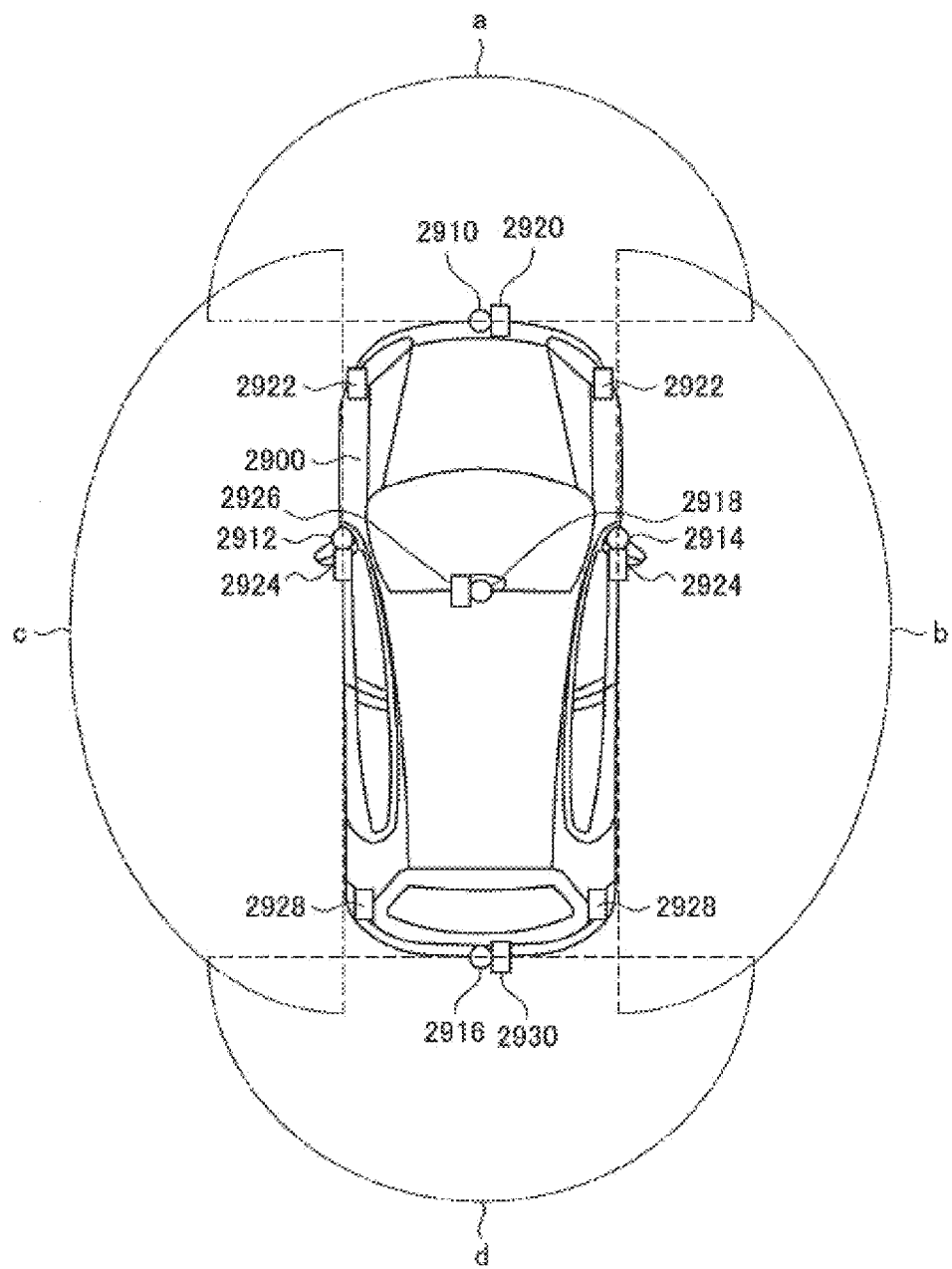

IMAGE PROCESSING DEVICE, IMAGING DEVICE, IMAGE PROCESSING METHOD AND PROGRAM

CROSS REFERENCE TO RELATED APPLICATIONS

This application claims the benefit of Japanese Priority Patent Application JP 2015-089983 filed Apr. 27, 2015, the entire contents of which are incorporated herein by reference.

TECHNICAL FIELD

The present technology relates to an image processing device, an imaging device, an image processing method, and a program. More particularly, the present technology relates to an image processing device and an imaging device that detect objects, and a processing method thereof, and a program for causing a computer to execute the method.

BACKGROUND ART

In recent years, information terminals that can be worn and carried, which are so-called wearable terminals, have gained attention, and the development and sales thereof have been proceeding. As an example, a glasses-type wearable terminal provided with a camera and a transmissive display has been proposed (for example, refer to PTL 1). This wearable terminal performs image processing such as a process of detecting a person in an image captured by the camera and displays subtitles and the like in a region on the display in which no person is positioned.

CITATION LIST

Patent Literature

[PTL 1]
JP 2012-108793A

SUMMARY

Technical Problem

In the related technology described above, however, as an image captured by the camera has a higher resolution, and as a frame rate thereof is higher, there is a problem of a processing amount of image processing such as detection of a person increasing. It is conceivable that lowering the resolution or the frame rate reduces an image processing amount; however, when the amount is lowered, accuracy in detecting a person deteriorates. Therefore, it is hard to reduce an image processing amount.

The present technology has been created taking the above circumstances into consideration, and it is desirable to reduce an image processing amount of a device that performs image processing.

Solution to Problem

An image processing device includes depth acquisition circuitry that uses a parallax corresponding to image data to electronically generate a depth map of an image and object detection circuitry that uses distance information and the depth map to electronically detect a specific object in the image by identifying specific pixels in the image data. The depth map includes information that pertains to distances from a reference position for each pixel in the image.

Advantageous Effects of Invention

According to an embodiment of the present technology, an excellent effect of reducing an image processing amount of a device that performs image processing can be exhibited. Note that effects described herein are not necessarily limitative, and any effect described in the present disclosure can be exhibited.

BRIEF DESCRIPTION OF DRAWINGS

FIG. 1 is an example of a perspective view of a glasses-type wearable terminal according to a first embodiment.

FIG. 2 is a diagram showing examples of imaging ranges of a main camera, a right camera, and left camera according to the first embodiment.

FIG. 3 is a block diagram showing a configuration example of the glasses-type wearable terminal according to the first embodiment.

FIG. 4 is a block diagram showing a configuration example of a camera unit and a signal processing unit according to the first embodiment.

FIG. 5 is a block diagram showing a configuration example of the main camera according to the first embodiment.

FIG. 6 is a block diagram showing a configuration example of an image processing unit and a display unit according to the first embodiment.

FIG. 7 is a block diagram showing a configuration example of a correction unit according to the first embodiment.

FIG. 8 is a flowchart showing an example of an operation of the glasses-type wearable terminal according to the first embodiment.

FIG. 9 is a flowchart showing a correction setting process according to the first embodiment.

FIG. 10 is a flowchart showing an object detection process according to the first embodiment.

FIG. 11 is a diagram showing examples of main image data and display data according to the first embodiment.

FIG. 12 is a diagram showing an example of a test sheet and main image data according to a first modified example of the first embodiment.

FIG. 13 is a block diagram showing a configuration example of a coordinate conversion unit according to the first modified example of the first embodiment.

FIG. 14 is a diagram for describing a correction method according to the first modified example of the first embodiment.

FIG. 15 is a block diagram showing a configuration example of a glasses-type wearable terminal according to a second modified example of the first embodiment.

FIG. 16 is a block diagram showing a configuration example of a glasses-type wearable terminal according to a third modified example of the first embodiment.

FIG. 17 is a block diagram showing an example of a camera unit according to the third modified example of the first embodiment.

FIG. 18 shows timing charts of examples of vertical synchronization signals according to the third modified example of the first embodiment.

FIG. 19 is a block diagram showing a configuration example of a camera unit and a signal processing unit according to a fourth modified example of the first embodiment.

FIG. 20 is a block diagram showing a configuration example of an image processing unit according to a second embodiment.

FIG. 21 is a flowchart showing an example of an operation of a glasses-type wearable terminal according to the second embodiment.

FIG. 22 is a flowchart showing a distance measurement process according to the second embodiment.

FIG. 23 is a diagram showing examples of main image data and display data according to the second embodiment.

FIG. 24 is an example of a perspective view of a glasses-type wearable terminal according to a third embodiment.

FIG. 25 is an example of a top view of the glasses-type wearable terminal according to the third embodiment.

FIG. 26 is a block diagram showing a configuration example of the glasses-type wearable terminal according to the third embodiment.

FIG. 27 is a block diagram showing a configuration example of a camera unit and a signal processing unit according to the third embodiment.

FIG. 28 is a block diagram showing a configuration example of an image processing unit according to the third embodiment.

FIG. 29 is a block diagram showing a configuration example of a correction unit according to the third embodiment.

FIG. 30 is a diagram showing examples of right eye image data and left eye image data according to the third embodiment.

FIG. 31 is a diagram for describing a method for setting a detection range according to the third embodiment.

FIG. 32 is a flowchart showing an object detection process according to the third embodiment.

FIG. 33 is a block diagram showing a configuration example of an image processing unit according to a first modified example of the third embodiment.

FIG. 34 is a table showing examples of dominant eye information for each piece of iris pattern information according to the first modified example of the third embodiment.

FIG. 35 is a flowchart showing an object detection process according to the first modified example of the third embodiment.

FIG. 36 is a flowchart showing a line-of-sight detection process according to the first modified example of the third embodiment.

FIG. 37 is a block diagram showing a configuration example of an image processing unit according to a second modified example of the third embodiment.

FIG. 38 is a diagram showing an example of a display position of a stereoscopic image according to the second modified example of the third embodiment.

FIG. 39 is a block diagram showing a configuration example of a glasses-type wearable terminal according to a third modified example of the third embodiment.

FIG. 40 is a timing chart showing an example of an operation of the glasses-type wearable terminal according to the third modified example of the third embodiment.

FIG. 41 is a timing chart showing an example of an operation of a glasses-type wearable terminal according to a fourth modified example of the third embodiment.

FIG. 42 is a block diagram showing a schematic configuration example of a vehicle control system.

FIG. 43 is an example of position of the imaging unit and the outside in-formation detection unit.

DESCRIPTION OF EMBODIMENTS

Embodiments for implementing the present technology (hereinafter, referred to as embodiments) will be described. Description will be provided in the following order.

1. First embodiment (Example in which an object is detected in a region of a depth in a predetermined range)
2. Second embodiment (Example in which the depth of a region in which an object has been detected is obtained or an object is detected in a region of a depth in a predetermined range)
3. Third embodiment (Example in which a line-of-sight direction is detected and an object is detected in a region of a depth in a predetermined range)

1. First Embodiment

Configuration Example of a Glasses-Type Wearable Terminal

FIG. 1 is an example of a perspective view of a glasses-type wearable terminal 100 according to a first embodiment. This glasses-type wearable terminal 100 is provided with rims 101 and 102, a main camera 111, a right camera 115, a left camera 116, a right transmissive display 151, and a left transmissive display 152.

An overall shape of the glasses-type wearable terminal 100 resembles that of glasses, and the terminal is provided with the right transmissive display 151 and the left transmissive display 152, instead of lenses of glasses. The right transmissive display 151 is mounted at a position facing the right eye of a user wearing the glasses-type wearable terminal 100, and the left transmissive display 152 is mounted at a position facing the left eye of the user.

The rim 101 is a member in which the right transmissive display 151 is mounted, and the rim 102 is a member in which the left transmissive display 152 is mounted. The main camera 111 and the right camera 115 are provided in the rim 101, and the left camera 116 is provided in the rim 102. In addition, on the assumption that the direction that the face of the user faces is a front direction (the direction of the arrow), the main camera 111, the right camera 115, and the left camera 116 are mounted on the surfaces of the rims 101 and 102 facing the front direction.

Note that, although the main camera 111 is configured to be provided in the rim 101, the main camera may be provided in any position other than the rim 101, such as the rim 102, in which at least a part of an imaging range thereof overlaps those of the right camera 115 and the left camera 116.

FIG. 2 is a diagram showing examples of imaging ranges of the main camera 111, the right camera 115 and the left camera 116 according to the first embodiment. In the drawing, the region surrounded by the solid line represents, when the direction to the top of the head of a user is set as an upper side, the imaging range of the main camera 111 viewed from the upper side. In addition, the region surrounded by the dotted-and-dashed line represents the imaging range of the right camera 115 viewed from the upper side, and the region surrounded by the dotted line represents the imaging range of the left camera 116 viewed from the upper side. Since all of the main camera 111, the right camera 115, and the left camera 116 are mounted in a front surface of the glasses-type wearable terminal 100, at least a part of the imaging ranges of the cameras overlap one another. A hatched portion in the drawing is the overlapping portion of the imaging ranges.

FIG. 3 is a block diagram showing a configuration example of the glasses-type wearable terminal 100 according to the first embodiment. This glasses-type wearable terminal 100 is provided with a camera unit 110, a signal processing unit 130, an image processing unit 200, a reference signal generation unit 120, an exposure control unit 140, and a display unit 150. Note that the glasses-type wearable terminal 100 is an example of an imaging device and an image processing device.

The reference signal generation unit 120 generates a vertical synchronization signal VSYNC as a reference signal indicating the timing to perform imaging. This reference signal generation unit 120 supplies the vertical synchronization signal VSYNC to the camera unit 110 via a signal line 129.

The camera unit 110 captures image data in synchronization with the vertical synchronization signal VSYNC. This camera unit 110 supplies the captured image data to the signal processing unit 130 via a signal line 119.

The signal processing unit 130 performs various kinds of signal processing such as a white balance process and a noise removal process on image data. The signal processing unit 130 supplies the processed image data to the exposure control unit 140 and the image processing unit 200 via a signal line 139. In addition, the signal processing unit 130 measures the amount of light from the image data and supplies the measured amount of light to the exposure control unit 140 via a signal line 138.

The image processing unit 200 executes predetermined image processing on the image data. This image processing includes a process of detecting a specific object such as a face, a person, or the like. The image processing unit 200 generates display data indicating the result of the detection of an object, and supplies the result to the display unit 150 via a signal line 209. For example, data for displaying the position, the shape, or the name of a detected object is generated as display data.

The exposure control unit 140 controls an amount of exposure of the camera unit 110 based on a measured amount of light. The exposure control unit 140 supplies exposure control signals for controlling the aperture or an exposure time to the camera unit 110 via a signal line 149. The display unit 150 displays the display data.

Note that the glasses-type wearable terminal 100 is further provided with an external interface that performs communication with external devices, and thus may transmit main image data or display data to the outside. In addition, the camera unit 110, the signal processing unit 130, the image processing unit 200, the reference signal generation unit 120, the exposure control unit 140, and the display unit 150 are configured to be provided in the same device; however, the constituent elements may be distributed in different apparatuses and devices. For example, it may be configured to provide the camera unit 110, the signal processing unit 130, the exposure control unit 140, and the display unit 150 in the glasses-type wearable terminal 100, and the image processing unit 200 in an external server, or the like. In addition, although the camera unit 110 and the like are configured to be provided in the glasses-type wearable terminal 100, the constituent elements may be provided in an apparatus or a device other than the glasses-type wearable terminal, such as a tablet terminal or a smartphone.

Configuration example of the camera unit and the signal processing unit FIG. 4 is a block diagram showing a configuration example of the camera unit 110 and the signal processing unit 130 according to the first embodiment. The camera unit 110 is provided with the main camera 111, the right camera 115 and the left camera 116. The signal processing unit 130 is provided with signal processing circuits 131, 132, and 133.

The main camera 111 captures the visual field of a user wearing the glasses-type wearable terminal 100. This main camera 111 supplies the captured image data to the signal processing circuit 131 as main image data. Note that the main camera 111 is an example of the main image capturing unit.

The right camera 115 and the left camera 116 capture imaging ranges that at least partially overlap that of the main camera 111. The right camera 115 and the left camera 116 capture a pair of parallax image data pieces of a parallax according to the distance between mounting positions of these cameras. The pair of parallax image data pieces has the same resolution. The right camera 115 supplies one piece of the parallax image data to the signal processing circuit 132 as right image data, and the left camera 116 supplies the other one piece of the parallax image data to the signal processing circuit 133 as left image data. Note that a module that includes the right camera 115 and the left camera 116 is an example of the parallax image capturing unit.

Here, it is desirable that the resolution of the pair of parallax image data pieces is lower than that of main image data. By lowering the resolution of the parallax image data, an amount of arithmetic operation in measuring a distance to be described below can be reduced and power consumption can be reduced. In addition, it is desirable that pixel data in the pair of parallax image data pieces does not include color information and pixel data in the main image data includes color information. Making a parallax image as a monochromic image is advantageous to increasing sensitivity of an image sensor more than when the parallax image is made to be a color image and to making effective use of the number of pixels in the image sensor. On the other hand, making the main image data as a color image can cause object detection accuracy to be improved more than when it is made as a monochromic image.

In addition, it is desirable that optical systems of the right camera 115 and the left camera 116 be the same. When such optical systems are equalized, it is difficult to perform calibration, causing optical distortion or the like.

Note that, although the main camera 111, the right camera 115, and the left camera 116 are provided in the same device (the glasses-type wearable terminal 100), the arrangement thereof is not limited to that configuration. The cameras may be distributed in different devices as long as the cameras are able to capture imaging ranges that at least partially overlap one another. When, however, the cameras are distributed in a plurality of devices, it is necessary to perform calibration for associating the coordinates of a main image and the coordinates of a parallax image when one of the devices moves. From the perspective of reducing a frequency of such calibration, it is desirable for the main camera 111, the right camera 115, and the left camera 116 to be provided in the same device.

In addition, it is desirable for the exposure control unit 140 to equalize exposure periods by controlling exposure start timings and exposure end timings at the time of capturing a main image and a parallax image. By equalizing the exposure periods, it is possible to eliminate an arithmetic operation for correcting differences of imaging conditions and to improve accuracy in detecting a distance measurement object.

The signal processing circuit 131 performs predetermined signal processing on the main image data. The signal processing circuit 132 performs the predetermined signal processing on the right image data. In addition, the signal processing circuit 133 performs the predetermined signal processing on the left image data. The signal processing circuits 131, 132, and 133 supply processed image data to the image processing unit 200. Further, the signal processing circuits 131, 132, and 133 measure an amount of light from the corresponding image data and supply the measured amount of light to the exposure control unit 140.

Configuration Example of the Main Camera

FIG. 5 is a block diagram showing a configuration example of the main camera 111 according to the first embodiment. This main camera 111 is provided with an imaging lens 112, an aperture 113, and an image sensor 114. Note that configurations of the right camera 115 and the left camera 116 are the same as that of the main camera 111. However, it is desirable for the main camera 111 to be a variable focus camera and the right camera 115 and the left camera 116 to be fixed focus cameras. Furthermore, it is desirable to adjust resolution of the right camera 115 and the left camera 116 so that a peak is in the same focal length. When the right camera 115 and the left camera 116 are fixed focus cameras, accuracy in distance measurement can be easily improved.

The imaging lens 112 condenses light from a subject and guides the light to the image sensor 114. The aperture 113 adjusts an amount of penetrating light according to the exposure control signals. The image sensor 114 converts light into electric signals and thereby generates the main image data in synchronization with the vertical synchronization signal VSYNC. In addition, the image sensor 114 changes an exposure time by controlling transistors inside pixels in the image sensor 114 according to the exposure control signals. The method of changing the exposure time by controlling transistors inside pixels in that manner is called an electronic shutter method.

Note that, although the main camera 111 changes the exposure time according to the electronic shutter method, the camera may be further provided with a mechanical shutter and change the exposure time by controlling the mechanical shutter. The same applies to the right camera 115 and the left camera 116.

In addition, although the right camera 115 and the left camera 116 are fixed focus cameras, the cameras may be variable focus cameras. In this case, it is desirable to control focal lengths of the cameras to be the same. Furthermore, although the main camera 111 is a variable focus camera, the camera may be a fixed focus camera.

Configuration Example of the Image Processing Unit and the Display Unit

FIG. 6 is a block diagram showing a configuration example of the image processing unit 200 and the display unit 150 according to the first embodiment. This image processing unit 200 is provided with a correction unit 210, an object detection unit 240, and a depth acquisition unit 250. In addition, the display unit 150 is provided with the right transmissive display 151 and the left transmissive display 152.

Here, the image processing unit 200 receives an input of a mode signal indicating an object detection mode or a correction setting mode. This object detection mode is for detecting a specific object. The correction setting mode is for setting correction data for correcting coordinate shifts of image data. The correction data includes, for example, a range in which a coordinate shift of image data is corrected, corrected and uncorrected coordinates of all pixels, and the like.

The correction unit 210 corrects a positional shift of mounting positions of the cameras, or a coordinate shift of each pixel from predetermined reference coordinates caused by optical distortion of the imaging lens 112. In the object detection mode, the correction unit 210 corrects a coordinate shift caused by at least one of a positional shift of the main camera 111 and optical distortion in the main image data, and supplies the result to the object detection unit 240. In addition, the correction unit 210 likewise corrects a coordinate shift caused by a positional shift or the like of the right camera 115 for the right image data, and supplies the result to the depth acquisition unit 250. Furthermore, the correction unit 210 likewise corrects a coordinate shift caused by a positional shift or the like of the left camera 116 for the left image data and supplies the result to the depth acquisition unit 250.

On the other hand, in the correction setting mode, the correction unit 210 sets correction data for correcting a coordinate shift for the main image data, the right image data, and the left image data. For example, the correction unit 210 detects feature points of the image data and normalizes the coordinates of the feature points to coordinates of a virtual integrated coordinate system in which no coordinate shift occurs. Then, the correction unit 210 matches the coordinates of the normalized feature points and thereby corrects the coordinate shift. By processing the normalized coordinates in that manner, arithmetic operations can be performed in such an ideal coordinate system without a shift, and processing such as matching can be dramatically reduced. In addition, by performing matching of the feature points, efficient correction can be performed with higher accuracy than when matching is performed on an entire image.

Note that, although the glasses-type wearable terminal 100 is configured to generate and set correction data by itself, an external device of the glasses-type wearable terminal 100 may be configured to generate and set correction data for the glasses-type wearable terminal 100.

The depth acquisition unit 250 acquires depths of pixels in the main image data from a parallax of the right image data and the left image data. Here, a depth indicates the distance from a reference position (the position of the imaging plane of image data, etc.) to a subject in the optical axis direction of the imaging lens 112. Since the imaging ranges of the main image data, the right image data, and the left image data partially overlap one another as described above, the acquisition of depths is executed only for pixels included in the overlapping range. The depth acquisition unit 250 supplies a depth map that shows depths of pixels to the object detection unit 240.

The object detection unit 240 executes an object detection process of detecting a specific object in the main image data. This object detection unit 240 obtains a region of the main image data constituted by pixels corresponding to a depth in the optical axis direction in a predetermined set range as a detection region using the depth map. The object detection unit 240 is assumed to retain the correspondence of the coordinates of pixels in the depth map and the coordinates of the pixels included in the main image data in advance. In addition, in the set range in the optical axis direction, for example, a range of distances Dn to Df from the imaging plane of a main image is set. For Dn to Df, values that raise sufficient accuracy for detecting a specific object are set in advance. The units of Dn to Df are, for example, meters. When a person or the like is detected as an object and if, for example, sufficient detection accuracy is obtained in the range of about 2 to 15 meters, 2 is set for Dn and 15 is set for Df Then, the object detection unit 240 executes the object detection process in a detection region of the main image data of which the depth in the set range is obtained. The object detection unit 240 generates display data indicating the detection result and supplies the data to the display unit 150.

The right transmissive display 151 and the left transmissive display 152 display data from the image processing unit 200 at the position at which the object is detected.

Configuration Example of the Correction Unit

FIG. 7 is a block diagram showing a configuration example of the correction unit 210 according to the first embodiment. This correction unit 210 is provided with a coordinate shift calculation unit 211 and coordinate conversion units 220, 212, and 213.

The coordinate shift calculation unit 211 calculates coordinate shifts for the main image data, the right image data, and the left image data in the correction setting mode. The coordinate shift calculation unit 211 generates correction data for correcting calculated coordinate shifts and supplies the data to the coordinate conversion units 220, 212, and 213.

The coordinate conversion unit 220 converts the uncorrected coordinates of the main image data into corrected coordinates using the correction data. This coordinate conversion unit 220 retains the correction data generated in the correction setting mode. In addition, the coordinate conversion unit 220 converts the uncorrected coordinates using the correction data in the object detection mode, and supplies converted main image data to the object detection unit 240.

The coordinate conversion unit 212 converts the uncorrected coordinates of the right image data into corrected coordinates using the correction data. The coordinate conversion unit 213 converts the uncorrected coordinates of the left image data into corrected coordinates using the correction data.

FIG. 8 is a flowchart showing an example of an operation of the glasses-type wearable terminal 100 according to the first embodiment. This operation starts, for example, when a power source is input or when a predetermined application is executed.

The glasses-type wearable terminal 100 determines whether the object detection mode is set (Step S901). When the correction setting mode is set (No in Step S901), the glasses-type wearable terminal 100 executes a correction setting process for setting correction data (Step S910). On the other hand, when the object detection mode is set (Yes in Step S901), the glasses-type wearable terminal 100 executes an object detection process of detecting a specific object (Step S920). After Step S910 or S920, the glasses-type wearable terminal 100 determines whether the correction setting process or the object detection process is completed (Step S902). When the process is not completed (No in Step S902), the glasses-type wearable terminal 100 repeats Step S901 and the successive steps. On the other hand, when the process is completed (Yes in Step S902), the glasses-type wearable terminal 100 finishes the operation.

FIG. 9 is a flowchart showing the correction setting process according to the first embodiment. The glasses-type wearable terminal 100 captures main image data (Step S911) and captures a pair of parallax image data pieces (Step S912). Then, the glasses-type wearable terminal 100 compares images of the data and calculates a coordinate shift (Step S913), and sets correction data (Step S914). After Step S914, the glasses-type wearable terminal 100 finishes the correction setting process.

FIG. 10 is a flowchart showing the object detection process according to the first embodiment. The glasses-type wearable terminal 100 captures main image data (Step S921), and captures a pair of parallax image data pieces (Step S922). Then, the glasses-type wearable terminal 100 corrects a coordinate shift of the image data (Step S923), and generates a depth map from the pair of parallax image data pieces (Step S924). In addition, the glasses-type wearable terminal 100 detects a specific object in a detection region in a predetermined range (Step S925), and displays the detection result (Step S926). After Step S926, the glasses-type wearable terminal 100 finishes the object detection process.

FIG. 11 is a diagram showing examples of main image data and display data according to the first embodiment. Item "a" in FIG. 11 shows an example of main image data 500, and item "b" in FIG. 11 shows an example of display data 510.

The main image data 500 includes subjects such as persons 501 and 502, and the like. This person 501 is standing at a position at a distance dl that is sufficiently away from the glasses-type wearable terminal 100, and thus her whole body is captured. For this reason, the glasses-type wearable terminal 100 can accurately detect the person at the distance d1. Meanwhile, the person 502 is standing at a position at a distance d2 that is very close to the terminal, and thus only a part of his face is captured. At the distance d2, there is a concern that the glasses-type wearable terminal 100 is not capable of accurately detecting the person due to the very close distance.

In this case, if a range that includes d1 but does not include d2 is set as a detection range, the glasses-type wearable terminal 100 performs the object detection process only in the region of d1, and thus can efficiently detect a person. Since the object detection process is not performed in the region of d2 in which the terminal is not capable of detecting a person, a processing amount of the object detection process can be reduced. Through the reduction of a processing amount, the glasses-type wearable terminal 100 can efficiently detect an object with lower power consumption.

In addition, the display data 510 includes a detection result 511 indicating the contour of the detected person 501. Note that, although the glasses-type wearable terminal 100 displays the contour of an object, the terminal is not limited to that configuration. For example, the glasses-type wearable terminal 100 may display a detection result other than a contour, such as a rectangular or an elliptical frame surrounding an object. In addition, the glasses-type wearable terminal 100 may display a virtual object at a position at which the object is overlaid on a detected real object. A technology for overlying a virtual object on a real object and displaying thereof is called an augmented reality (AR) technology.

According to the first embodiment of the present technology described above, since the glasses-type wearable terminal 100 executes the object detection process only in a detection region 503 composed of pixels corresponding to a depth in a predetermined range, a processing amount with respect to a depth region other than the predetermined range can be reduced. Accordingly, power consumption of the glasses-type wearable terminal 100 can be reduced.

First Modified Example

In the first embodiment described above, the glasses-type wearable terminal 100 corrects a coordinate shift of all pixels using a table in which corrected and uncorrected coordinates are associated. However, when the resolution of image data increases and the size of the table increases, there is a concern of the capacity of a memory that retains the table becoming insufficient. A glasses-type wearable terminal 100 of a first modified example of the first embodiment is different from that of the first embodiment in that the size of a table that retains corrected and uncorrected coordinates is reduced.

FIG. 12 is a diagram showing an example of a test sheet and main image data according to the first modified example of the first embodiment. Item "a" in FIG. 12 is an example of a test sheet 515. Item "b" in FIG. 12 shows an example of main image data 516 obtained when the main camera 111 captures the test sheet 515.

A sheet printed with an image in which a plurality of black circles is arrayed with predetermined gaps in a two-dimensional grid shape is used as the test sheet 515. These black circles are used as representative points.

At the time of factory shipment, repair, or the like, a worker sets the correction setting mode for the glasses-type wearable terminal 100 and arranges the test sheet 515 at a predetermined position. Then, the worker operates the glasses-type wearable terminal 100 to capture the test sheet 515. The main camera 111 of the glasses-type wearable terminal 100 captures the test sheet 515 and generates the main image data 516.

Here, when there is optical distortion in the imaging lens 112 of the main camera 111, the coordinates of the representative points of the main image data 516 are shifted from reference coordinates. Here, the reference coordinates are coordinates corresponding to the representative points of the test sheet 515 in terms of design of the main image data 516. In addition, when the mounting position of the main camera 111 is shifted due to unevenness in manufacturing, the coordinates of the representative points of the main image data 516 are shifted from the reference coordinates. For example, distortion of an upper-left region of the test sheet 515 is attributable to optical distortion. In addition, an overall shift of the representative points of the test sheet 515 to the right in comparison to the main image data 516 is attributable to a positional deviation of the mounting position.

The glasses-type wearable terminal 100 calculates the coordinate shifts of the representative points of the main image data 516, and creates a table in which corrected and uncorrected coordinates are associated with the representative points. The same process is also performed on the right image data and the left image data.

FIG. 13 is a block diagram showing a configuration example of the coordinate conversion unit 220 according to the first modified example of the first embodiment. This coordinate conversion unit 220 is provided with a correction range storage unit 221, a read address counter 222, a write address counter 223, a read address decoder 224, a write address decoder 225, and a distortion correction table 226. In addition, the coordinate conversion unit 220 is provided with a distortion correction address generation unit 227, a delay adjustment unit 228, a distortion correction address decoder 229, a write control unit 230, a read control unit 231, an image memory 232, and an interpolation processing unit 233. Note that configurations of coordinate conversion units 212 and 213 of the first modified example are the same as that of the coordinate conversion unit 220.

The correction range storage unit 221 stores a correction range in which a coordinate shift is corrected. For example, a range of the horizontal and vertical coordinates of valid pixels excluding invalid pixels is set as a correction range. In addition, a correction range is set by the coordinate shift calculation unit 211.

The write address counter 223 counts values in synchronization with timing signals such as a vertical synchronization frequency and a horizontal synchronization frequency. The write address counter 223 performs counting in synchronization with a vertical synchronization signal in the correction range of vertical coordinates, and performs counting in synchronization with a horizontal synchronization signal in the correction range of horizontal coordinates. A value counted in synchronization with the vertical synchronization signal indicates a vertical write address, and a value counted in synchronization with the horizontal synchronization signal indicates a horizontal write address. The write address counter 223 supplies a write address constituted by the vertical write address and the horizontal write address to the write address decoder 225 and the read address counter 222. In addition, the write address counter 223 supplies the range of the vertical write address and the horizontal write address corresponding to the correction range to the write address decoder 225 and the read address counter 222 as a write range.

The read address counter 222 counts values in synchronization with output timings of write addresses. This read address counter 222 counts values in a write range in synchronization with an output timing of the vertical write address and generates a vertical read address. In addition, the read address counter 222 counts values in the write range in synchronization with an output timing of the horizontal write address and generates a horizontal read address. The read address counter 222 supplies a read address R constituted by the vertical read address and the horizontal read address to the read address decoder 224. Furthermore, the read address counter 222 supplies the range of the vertical read address and the horizontal read address corresponding to the write range to the read address decoder 224 as a read range.

The distortion correction table 226 stores an association of an uncorrected table address and a corrected table address. Here, the uncorrected table address is an uncorrected address of the representative points, and the corrected table address is an address obtained by correcting a coordinate shift of the corresponding uncorrected table address. These addresses are set by the coordinate shift calculation unit 211.

The read address decoder 224 calculates an interpolation coefficient for the read addresses R that does not correspond to the representative points. First, the read address decoder 224 determines whether the read address R is the uncorrected table address (i.e., the address of a representative point) with reference to the distortion correction table 226. When the read address R is the address of the representative point, the read address decoder 224 supplies the read address R to the distortion correction address generation unit 227 without change.

On the other hand, when the read address R is not the address of the representative point, the read address decoder 224 reads 4 uncorrected table addresses A, B, C, and D in the periphery of the address from the distortion correction table 226 to obtain an interpolation coefficient from these addresses. Here, it is assumed that coordinates of the uncorrected table addresses A, B, C, and D are $(H_A, V_A)$, $(H_B, V_B)$, $(H_C, V_C)$, $(H_D, V_D)$, and the relations of $H_B > H_A$, $V_C > V_A$, $V_D > V_B$ and $H_D > H_C$ are established. In this case, the read address decoder 224 performs linear interpolation between a straight line AC passing A and C and a straight line BD passing B and C and obtains a straight line passing the read address R as an interpolation straight line. For example, the slope and the intercept of the straight line AC are set to $(a_1, b_1)$, the slope and the intercept of the straight line BD are set to $(a_2, b_2)$, and the read address R is set to $(H_R, V_R)$, and thereby the slope and the intercept of the interpolation straight line $(a_0, b_0)$ are calculated using the following Formulas.

$$(a_0-a_1)/(a_2-a_1)=(b_0-b_1)/(b_2-b_1) \quad \text{Formula 1}$$

$$V_R=a_0 \times H_R+b_0 \quad \text{Formula 2}$$

The read address decoder 224 calculates coordinates $(H_M, V_M)$ of an intersection M of the calculated interpolation straight line and a straight line AB connecting A and B, and calculates coordinates $(H_N, V_N)$ of an intersection N of the calculated interpolation straight line and a straight line CD connecting C and D. The read address decoder 224 obtains an internal division ratio m at which a segment MN connecting M and N is internally divided by the read address R using, for example, the following Formula.

$$(H_M-H_R):(H_R-H_N)=m:(1-m) \quad \text{Formula 3}$$

In addition, the read address decoder 224 performs linear interpolation between the straight line AB and the straight line CD to obtain an interpolation straight line passing the read address R. For example, the slope and the intercept of AB are set to $(a_1, b_1)$, and the slope and the intercept of CD are set to $(a_2, b_2)$, and the slope and the intercept of the interpolation straight line $(a_0, b_0)$ are calculated using Formulas 1 and 2.

The read address decoder 224 calculates coordinates $(H_O, V_O)$ of an intersection of the calculated interpolation straight line and the straight line AC, and calculates coordinates $(H_P, V_P)$ of an intersection P of the interpolation straight line and the straight line BD. The distortion correction address generation unit 227 obtains an internal division ratio n at which a segment OP is internally divided by the read address R using, for example, the following Formula.

$$(H_O-H_R):(H_R-H_P)=n:(1-n) \quad \text{Formula 4}$$

Then, the read address decoder 224 supplies the calculated interpolation coefficients m and n, the read address R, and the uncorrected table addresses A, B, C, and D to the distortion correction address generation unit 227. The read address decoder 224 supplies the interpolation coefficients m and n and the read address R to the interpolation processing unit 233.

The distortion correction address generation unit 227 generates a distortion correction address R' at which the distortion has been corrected from the read address R. When this distortion correction address generation unit 227 receives only the read address R from the read address decoder 224, the unit reads the corrected table address corresponding to the read address R from the distortion correction table 226. Then, the distortion correction address generation unit 227 supplies the read address to the distortion correction address decoder 229 as the distortion correction address R'.

Meanwhile, upon receiving the interpolation coefficients and the like along with the read address R, the distortion correction address generation unit 227 reads corrected table addresses A', B', C', and D' corresponding to the uncorrected table addresses A, B, C, and C from the distortion correction table 226. In addition, the distortion correction address generation unit 227 converts the interpolation coefficients m and n into interpolation coefficients after distortion correction m' and n'. Here, the interpolation coefficients after distortion correction m' and n' are coefficients closest to the interpolation coefficients m and n among a predetermined coefficient group. This coefficient group is constituted by coefficients according to the number of pixels in a segment connecting A' and B'. For example, when the number of pixels in a segment A'B' from A' to B' is 4, an interval division ratio at which this segment is internally divided is a value of 0, ¼, 2/4, ¾, and 1. In this case, in the coefficient group composed of 0, ¼, 2/4, ¾, and 1, coefficients closest to the interpolation coefficients m and n are selected as the interpolation coefficients after distortion correction m' and n'.

The distortion correction address generation unit 227 obtains the distortion correction address R' corresponding to the read address R from the corrected table addresses A', B', C', and D' and the interpolation coefficients after distortion correction m' and n'. For example, coordinates of A', B', C', and D' are $(H_A', V_A')$, $V_B'$), $(H_C', V_C')$, and $(H_D', V_D')$, and coordinates $(H_R', V_R')$ of R' are calculated using the following Formulas.

$$(H_B'-H_R'):(H_R'-H_A')=m':(1-m') \quad \text{Formula 5}$$

$$(V_D'-V_R'):(V_R'-V_A')=n':(1-n') \quad \text{Formula 6}$$

The distortion correction address generation unit 227 supplies the distortion correction address R' obtained using the above Formulas to the distortion correction address decoder 229. In addition, the distortion correction address generation unit 227 supplies the interpolation coefficients after distortion correction to the interpolation processing unit 233. Note that the distortion correction address generation unit 227 is an example of the interpolation unit.

The distortion correction address decoder 229 converts the distortion correction address R' into an address on the image memory 232. The distortion correction address decoder 229 supplies the converted address to the read control unit 231 as a read memory address.

The write address decoder 225 converts the write address into an address on the image memory 232. The write address decoder 225 supplies the converted address to the write control unit 230 as a write memory address.

The delay adjustment unit 228 delays each piece of pixel data in the main image data a predetermined period of time and sequentially supplies the data to the write control unit 230.

The write control unit 230 issues a write command designating the write memory address and supplies the command to the image memory 232, and writes pixel data into the write memory address. The image memory 232 stores main image data. The read control unit 231 issues a read command designating the read memory address and supplies the command to the image memory 232, and reads pixel data. This read control unit 231 supplies the read pixel data to the interpolation processing unit 233.

The interpolation processing unit 233 performs interpolation for insufficient pixels in the main image data read from the image memory 232. For example, when the number of pixels in the region surrounded by the uncorrected A, B, C, and D is 15 and the number of pixels in the region surrounded by corrected A', B', C', and D' is 16, it is necessary to interpolate one pixel. The interpolation processing unit 233 performs interpolation with necessary pixel data based on the interpolation coefficients, the interpolation coefficients after distortion correction, the read address R and the pixel data read from the image memory. The interpolation processing unit 233 supplies the interpolated image data to the object detection unit 240 as main image data of which distortion has been corrected.

FIG. 14 is a diagram for describing a correction method according to the first modified example of the first embodiment. Item "a" in FIG. 14 indicates the uncorrected table addresses A, B, C, and D and the read address R. Item "b" in FIG. 14 indicates the corrected table addresses A', B', C', and D' and the distortion correction address R'.

When the read address R is not the address of a representative point, the read address decoder 224 reads the addresses of four representative points in the periphery of R, i.e., the read uncorrected addresses A, B, C, and D from the distortion correction table 226.

The read address decoder 224 performs linear interpolation between the straight line AC and the straight line BD to obtain a straight line passing the read address R as an interpolation straight line using Formulas 1 and 2. The distortion correction address generation unit 227 calculates the coordinates of the intersection M of the interpolation straight line and the straight line AB, and calculates the coordinates of the intersection N between the interpolation straight line and the straight line CD. Then, the read address decoder 224 obtains an internal division ratio m at which the segment MN is internally divided by the read address R.

In addition, the read address decoder 224 performs linear interpolation between the straight line AB and the straight line CD to obtain a straight line passing the read address R as an interpolation straight line. The distortion correction address generation unit 227 calculates the coordinates of the intersection O of the interpolation straight line and the straight line AC, and calculates the coordinates of the intersection P between the interpolation straight line and the straight line BD. Then, the read address decoder 224 obtains an internal division ratio n at which the segment OP is internally divided by the read address R.

The distortion correction address generation unit 227 reads the corrected table addresses A', B', C', and D' corresponding to the uncorrected table addresses A, B, C, and D. In addition, the distortion correction address generation unit 227 obtains correction coefficients after distortion correction m' and n' from the correction coefficients m and n. Then, as exemplified in item "b" in FIG. 14, the distortion correction address generation unit 227 obtains the distortion correction address R' corresponding to the read address R from the obtained m' and n' and the corrected data addresses A', B', C', and D' using Formulas 5 and 6.

As described above, the distortion correction address generation unit 227 interpolates the coordinates of a point that does not correspond to a representative point from the coordinates of the four representative points, and thus the distortion correction table 226 may only retain the corrected and uncorrected coordinates of the representative points. Thus, the size of the distortion correction table 226 can be reduced compared to that of a configuration in which corrected and uncorrected coordinates of all pixels are retained.

According to the first modified example of the first embodiment of the present technology described above, the glasses-type wearable terminal 100 interpolates the coordinates other than those of the representative points using the coordinates of the representative points, and thus the size of the distortion correction table 226 can be reduced.

Second Modified Example

The glasses-type wearable terminal 100 of the first embodiment described above can perform imaging at the same frame rate even when a user moves his or her head. However, since the position of an object of image data also significantly changes when there is a motion of the head, there is concern of the object not being accurately detected.

A glasses-type wearable terminal 100 according to a second modified example of the first embodiment is different from that of the first embodiment in that the main camera 111 and the like are controlled such that an object can be accurately detected even when there is a motion of a head.

FIG. 15 is a block diagram showing a configuration example of the glasses-type wearable terminal 100 according to the second modified example of the first embodiment. The glasses-type wearable terminal 100 according to the second modified example of the first embodiment is different from the first embodiment in that the terminal is further provided with an acceleration sensor 160.

The acceleration sensor 160 detects an acceleration of the glasses-type wearable terminal 100 at a fixed sampling rate. The acceleration sensor 160 supplies a detected acceleration value to the reference signal generation unit 120 and exposure control unit 140. In addition, it is desirable for the sampling rate at which the acceleration sensor 160 detects the acceleration to be higher than a frame rate of parallax image data. Since acceleration sensors generally consume less power than image sensors, a sampling rate of an acceleration sensor is easier to increase than an image sensor.

A reference signal generation unit 120 of the second modified example increases the frequency of a vertical synchronization signal VSYNC as the acceleration increases. Accordingly, a frame rate of image data such as main image data also increases. In addition, an exposure control unit 140 of the second modified example reduces an exposure time as the acceleration increases.

According to the second modified example of the first embodiment of the present technology described above, the glasses-type wearable terminal 100 captures image data at a higher frame rate as the acceleration increases, and thus an object can be accurately detected even when a user moves his or her head.

Third Modified Example

The glasses-type wearable terminal 100 of the first embodiment described above performs imaging with respect to main image data and a pair of parallax image data pieces (right image data and left image data) at the same frame rate. In this configuration, however, it is not possible to perform imaging of main image data at a different interval from an interval at which distance measurement and object detection are performed using the parallax image data. A glasses-type wearable terminal 100 of a third modified example of the first embodiment is different from that of the first embodiment in that imaging is performed at a different interval from an interval of distance measurement and object detection.

FIG. 16 is a block diagram showing a configuration example of the glasses-type wearable terminal 100 according to the third modified example of the first embodiment. The glasses-type wearable terminal 100 according to the third modified example of the first embodiment is different from that of the first embodiment in that the former is provided with a reference signal generation unit 121 in place of the reference signal generation unit 120, and is further provided with a recording unit 165.

The recording unit 165 records main image data. In addition, the reference signal generation unit 121 generates vertical synchronization signals VSYNC1 and VSYNC2 having different frequencies. The reference signal generation unit 121 supplies these vertical synchronization signals to a camera unit 110 via signal lines 128 and 129.

Here, a ratio of the frequencies of VSYNC1 and VSYNC2 is preferably an integer ratio. When it is set to an integer ratio, a timing of depth calculation and a timing of object detection can be uniform. This is because, when the ratio of the frequencies of VSYNC1 and VSYNC2 is not an integer ratio, it is necessary to perform interpolation on one of main image data and parallax image data.

FIG. 17 is a block diagram showing an example of the camera unit 110 according to the third modified example of the first embodiment. The vertical synchronization signal VSYNC1 is supplied to the main camera 111, and the vertical synchronization signal VSYNC2 is supplied to the right camera 115 and the left camera 116.

Accordingly, main image data and parallax image data are captured at different frame rates.

In addition, an object detection unit 240 of the third modified example detects an object in synchronization with VSYNC2 corresponding to the right camera 115 and the left camera 116, rather than VSYNC1 corresponding to the main camera 111.

FIG. 18 shows timing charts of examples of the vertical synchronization signals according to the third modified example of the first embodiment. Item "a" in FIG. 18 is a timing chart when the frequency of the vertical synchronization signal VSYNC1 is set to three times that of the vertical synchronization signal VSYNC2. Accordingly, the main image data is captured at a frame rate three times higher than that of the parallax image data. Distance measurement and object detection are executed in synchronization with the vertical synchronization signal VSYNC2 having a lower frequency, such as at time points T1, T2, and the like.

Item "b" in FIG. 18 is a timing chart when the frequency of the vertical synchronization signal VSYNC1 is set to ⅓ that of the vertical synchronization signal VSYNC2. Accordingly, the main image data is captured at a frame rate that is ⅓ that of the parallax image data. Distance measurement and object detection are executed in synchronization with the vertical synchronization signal VSYNC1 having a lower frequency, such as at the time points T1, T2, and the like.

By setting ratios of the frame rates of the main image data and the parallax image data at an integer ratio, time points of object detection and time points of distance measurement can be easily matched as shown in FIG. 18. In addition, by setting the frame rates of the main image data and the parallax image data to be different values, an imaging interval of image data and an interval of distance measurement and object detection can be separately adjusted.

Since the glasses-type wearable terminal 100 captures the main image data and the parallax image data at different frame rates according to the third modified example of the first embodiment of the present technology described above, imaging can be performed at a different interval from that of distance measurement and object detection.

Fourth Modified Example

In the first embodiment described above, objects are detected using three cameras including the main camera 111, the right camera 115, and the left camera 116. In the configuration, which assumes that three cameras are used, a glasses-type wearable terminal provided with only two cameras is not capable of detecting an object. A glasses-type wearable terminal 100 according to a fourth modified example of the first embodiment is different from that of the first embodiment in that the glasses-type wearable terminal provided with only two cameras detects objects.

FIG. 19 is a block diagram showing a configuration example of a camera unit 110 and a signal processing unit 130 according to the fourth modified example of the first embodiment. The camera unit 110 of the fourth modified example of the first embodiment is different from that of the first embodiment in that the main camera 111 is not provided. In addition, the signal processing unit 130 of the fourth modified example of the first embodiment is different from that of the first embodiment in that the signal processing circuit 131 is not provided.

In addition, an object detection unit 240 of the fourth modified example receives input of at least one of right image data and left image data as main image data. Alternatively, the right image data and the left image data are input to the object detection unit 240, and the object detection unit 240 generates an image obtained by combining the data as main image data. The object detection unit 240 detects an object in the main image data as in the first embodiment. A depth acquisition unit 250 of the fourth modified example receives input of the right image data and the left image data as in the first embodiment.

Since the glasses-type wearable terminal 100 according to the fourth modified example of the first embodiment of the present technology as described above detects objects using the right camera 115 and the left camera 116, it is not necessary to provide the main camera 111 and the signal processing circuit 131. Accordingly, the number of parts and power consumption can be reduced.

2. Second Embodiment

The glasses-type wearable terminal 100 of the first embodiment described above generates a depth map; however, a processing amount of a process of generating a depth map increases as resolution or a frame rate of parallax image data increases. A glasses-type wearable terminal 100 of a second embodiment is different from that of the first embodiment in that a processing amount of depth map generation is reduced using a result of object detection.

FIG. 20 is a block diagram showing a configuration example of an image processing unit 200 according to the second embodiment. The image processing unit 200 according to the second embodiment is different from that of the first embodiment in that an object detection unit 241 and a depth acquisition unit 251 are provided in place of the object detection unit 240 and the depth acquisition unit 250.

In addition, in the second embodiment, a distance measurement mode is further set through an operation of a user in addition to the correction setting mode and the object detection mode. This distance measurement mode is for measuring a distance to a specific object and for causing a display unit 150 to display the distance.

When the distance measurement mode is set, the object detection unit 241 executes an object detection process with respect to an entire region corresponding to a parallax image of main image data and supplies the result to the depth acquisition unit 251. Then, the depth acquisition unit 251 acquires a depth only in a region in which a specific object is detected based on the detection result, generates a depth map, and supplies the depth map to the display unit 150. The display unit 150 displays a distance indicated by the depth map.

Meanwhile, when the correction setting mode or the object detection mode is set, the object detection unit 241 and the depth acquisition unit 251 perform the same processes as in the first embodiment.

FIG. 21 is a flowchart showing an example of an operation of the glasses-type wearable terminal 100 according to the second embodiment. The operation of the glasses-type wearable terminal 100 according to the second embodiment is different from that of the first embodiment in that Steps 5903 and 5950 are further executed.

When the mode is not the object detection mode (No in Step S901), the glasses-type wearable terminal 100 determines whether it is the distance measurement mode (Step S903). When it is the distance measurement mode (Yes in Step S903), the glasses-type wearable terminal 100 executes a distance measurement process of acquiring a depth (i.e., distance) only in a region in which a specific object is detected (Step S950). On the other hand, when it is the correction setting mode (No in Step S903), the glasses-type wearable terminal 100 executes a correction setting process (Step S910). After Step S910, S920, or S950, the glasses-type wearable terminal 100 executes Step S902.

FIG. 22 is a flowchart showing the distance measurement process according to the second embodiment. The glasses-type wearable terminal 100 captures main image data (Step S951), and captures a pair of parallax images (Step S952). The glasses-type wearable terminal 100 corrects a coordinate shift of each image data (Step S953), and detects a specific object in the main image data (Step S954). Then, the glasses-type wearable terminal 100 generates a depth map only for the region in which the object is detected using the pair of parallax images (Step S955), and displays a distance based on the depth map (Step S956). After Step S956, the glasses-type wearable terminal 100 finishes the distance measurement process.

FIG. 23 is a diagram showing examples of main image data and display data according to the second embodiment. Item "a" in FIG. 23 shows an example of the main image data 520, and item "b" in FIG. 23 shows an example of the display data 530.

Subjects such as persons 521, 522, and the like are taken in the main image data 520. The person 522, however, is not entirely taken, and thus he is not detected as a person in the object detection process. When the distance measurement mode is set, the glasses-type wearable terminal 100 detects the person 521 in the main image data 520. Then, the glasses-type wearable terminal 100 generates a depth map only for the region of the detected person 521.

The display data 530 includes the detection result 531 of the person and distance information 532. This distance information 532 indicates the distance to the detected person 521.

Since the glasses-type wearable terminal 100 of the second embodiment of the present technology acquires a depth only for the region of the main image data in which a specific object is detected as described above, a processing amount of the process of acquiring the depth can be reduced.

3. Third Embodiment

The glasses-type wearable terminal 100 of the first embodiment described above detects an object using image data from three cameras including the main camera 111, the right camera 115, and the left camera 116. When a plurality of objects are taken in main image data, however, a processing amount of object detection increases as the number of objects increases. A glasses-type wearable terminal 100 of a third embodiment is different from that of the first embodiment in that, when a plurality of objects are taken, a processing amount of object detection is reduced.

FIG. 24 is an example of a perspective view of the glasses-type wearable terminal 100 according to the third embodiment. The glasses-type wearable terminal 100 of the third embodiment is different from that of the first embodiment in that a right infrared camera 117, a left infrared camera 118, a right infrared projector 181, and a left infrared projector 182 are further provided. The right infrared camera 117 and the right infrared projector 181 are mounted on a back surface of a rim 101 when the direction in which the face of a user faces is assumed to be the front direction. In addition, the left infrared camera 118 and the left infrared projector 182 are mounted on the back surface of a rim 102.

The right infrared projector 181 radiates infrared light at the position at which the right eye of a user is assumed to be present. The left infrared projector 182 radiates infrared light at the position at which the left eye of the user is assumed to be present.

The right infrared camera 117 captures the right eye of a user by converting infrared light into an electric signal, and the left infrared camera 118 captures the left eye of the user by converting infrared light into an electric signal.

FIG. 25 is an example of a top view of the glasses-type wearable terminal 100 according to the third embodiment. A main camera 111, a right camera 115 and a left camera 116 are provided on front surfaces of the rims 101 and 102, and convert visual light into electric signals. Meanwhile, the right infrared projector 181 and the left infrared projector 182 are provided on the back surfaces of the rims 101 and 102. The right infrared projector 181 and the left infrared projector 182 radiate infrared light to the eyes of a user. In addition, the right infrared camera 117 and the left infrared camera 118 are provided on the back surfaces of the rims 101 and 102, and convert infrared light reflected on the eyes of the user into an electric signal and thereby capture an image of the eyes. By providing the infrared cameras at the positions at which reflected light from the infrared projectors are easily received as described above, it is possible to minimize influence of external light such as sunlight that has strong infrared light.

FIG. 26 is a block diagram showing a configuration example of the glasses-type wearable terminal 100 according to the third embodiment. The glasses-type wearable terminal 100 of the third embodiment is further provided with a light emission control unit 170, and the right infrared projector 181 and the left infrared projector 182.

A reference signal generation unit 120 of the third embodiment supplies a vertical synchronization signal VSYNC not only to a camera unit 110 but also to the light emission control unit 170.

The light emission control unit 170 controls the right infrared projector 181 and the left infrared projector 182 to emit light. This light emission control unit 170 causes the right infrared projector 181 and the left infrared projector 182 to continuously emit light through a period in which the vertical synchronization signal VSYNC is supplied from the reference signal generation unit 120. In addition, the light emission control unit 170 adjusts the intensity of light emission of the right infrared projector 181 and the left infrared projector 182 when necessary based on the brightness of an imaging environment and the like.

FIG. 27 is a block diagram showing a configuration example of the camera unit 110 and a signal processing unit 130 according to the third embodiment. The camera unit 110 of the third embodiment is further provided with the right infrared camera 117 and the left infrared camera 118. The signal processing unit 130 of the third embodiment is further provided with signal processing circuits 134 and 135.

The right infrared camera 117 captures the right eye of a user and supplies right eye image data to the signal processing circuit 134. The left infrared camera 118 captures the left eye of the user and supplies left eye image data to the signal processing circuit 135. Note that a module that includes the right infrared camera 117 and the left infrared camera 118 is an example of the eye image capturing unit.

The signal processing circuit 134 performs signal processing on the right eye image data, and the signal processing circuit 135 performs signal processing on the left eye image data.

An exposure control unit 140 of the third embodiment further controls an exposure amount of the right infrared camera 117 and the left infrared camera 118. By additionally controlling the exposure of the infrared cameras, an influence caused when external light is suddenly incident on the infrared cameras can be eased. When the terminal is assumed to be under direct sunlight based on a measured light amount, for example, the exposure control unit 140 reduces an exposure amount of the right infrared camera 117 and the left infrared camera 118, and thus the influence of the external light reflected on the face of a user may be minimized. In addition, the reference signal generation unit 120 of the third embodiment further supplies the vertical synchronization signal VSYNC to the right infrared camera 117 and the left infrared camera 118.

Note that, although the reference signal generation unit 120 supplies the same vertical synchronization signal to the main camera 111 and the infrared cameras (117 and 118), vertical synchronization signals with different frequencies may be supplied. Also in this case, it is desirable that a ratio of the frequencies of the vertical synchronization signals be an integer ratio as in the third modified example of the first embodiment.

FIG. 28 is a block diagram showing a configuration example of an image processing unit 200 according to the third embodiment. The image processing unit 200 of the third embodiment is further provided with a line-of-sight direction detection unit 260.

A correction unit 210 of the third embodiment further corrects the right eye image data and the left eye image data, and supplies the corrected image data to the line-of-sight direction detection unit 260.

In addition, the line-of-sight direction detection unit 260 detects line-of-sight directions of the right eye and the left eye of a user from the right eye image data and the left eye image data. The line-of-sight direction detection unit 260 supplies the line-of-sight directions to an object detection unit 242.

The object detection unit 242 calculates the distance to a subject positioned on the straight line in the line-of-sight directions, and sets a region composed of pixels at a depth within a given range including the distance as a detection region. Then, the object detection unit 242 performs an object detection process in the detection region. For example, the distance from a reference position in the optical axis direction to a point-of-regard at which the line-of-sight directions of the right eye and the left eye intersect is calculated as the distance from the subject on the straight line in the line-of-sight directions.

Note that, when main image data, right eye image data and left eye image data are captured at different frame rates using two vertical synchronization signals with difference frequencies, the object detection unit 242 and the line-of-sight direction detection unit 260 perform processes at the same timing. For example, when VSYNC1 is supplied to the main camera 111 and VSYNC2 having a lower frequency than the VSYNC1 is supplied to the infrared cameras, the object detection unit 242 and the line-of-sight direction detection unit 260 perform processes in synchronization with the VSYNC2. In addition, when VSYNC1 is supplied to the main camera 111 and VSYNC2 having a higher frequency than the VSYNC1 is supplied to the infrared cameras, the object detection unit 242 and the line-of-sight direction detection unit 260 perform processes in synchronization with the VSYNC1. A ratio of the frequencies of VSYNC1 and VSYNC2, however, is assumed to be an integer ratio.

FIG. 29 is a block diagram showing a configuration example of a correction unit 210 according to the third embodiment. The correction unit 210 of the third embodiment is further provided with coordinate conversion units 214 and 215.

The coordinate conversion unit 214 converts uncorrected coordinates of the right eye image data into corrected coordinates, and the coordinate conversion unit 215 converts uncorrected coordinates of the left eye image data into corrected coordinates. In addition, in the third embodiment, correction data is set for the coordinate conversion units 214 and 215.

FIG. 30 is a diagram showing examples of right eye image data 540 and left eye image data 550 according to the third embodiment. Item "a" in FIG. 30 is an example of the right eye image data 540 and item "b" in FIG. 30 is an example of the left eye image data 550.

In the right eye image data 540, a pupil 541 of the right eye of a user and infrared light 542 reflected on the cornea are taken. In addition, in the left eye image data 550, a pupil 551 of the left eye of the user and infrared light 552 reflected on the cornea are taken. The line-of-sight direction detection unit 260 detects line-of-sight directions of the right eye and the left eye based on the positions of the pupils with respect to the positions of the reflection on the corneas. This method for obtaining a line-of-sight direction using a reflection on a cornea is called a pupil-corneal reflection method. Details of this pupil-corneal reflection method are described in "Eye Tracking System based on Eyeball Model—For Realization of Gaze Input Device" written by Takehiko Ohno and two more authors in research paper 2001-HI-93 of Information Processing Society of Japan.

Note that the line-of-sight direction detection unit 260 may detect line-of-sight directions using a method other than the pupil-corneal reflection method. For example, a camera that photoelectrically converts visual light may be provided instead of an infrared camera, and a line-of-sight direction may be detected based on a positional relation between the inner corner of an eye and the iris thereof in an image of the eye captured by the camera. In this case, while accuracy in detecting the line-of-sight direction is lowered, no infrared camera and infrared projector are necessary.

FIG. 31 is a diagram for describing a method for setting a detection range according to the third embodiment. This drawing shows an imaging range viewed from the top of the head of a user. In the drawing, the thick solid line indicates an imaging plane of a main image and the dotted lines indicate lines of sight.

Here, persons 600 and 601 are in the imaging range, and the user is gazing at the person 600. In addition, a distance from an imaging plane to the person 600 is d1, and a distance from the imaging plane of the main image to the person 601 is d2. In this case, the glasses-type wearable terminal 100 detects the line-of-sight directions of the right eye and the left eye, and calculates the distance d1 from the point-of-regard at which the directions intersect the imaging plane. Referring to a depth map, the glasses-type wearable terminal 100 executes an object detection process in a detection region in which a depth of a given range that includes the calculated d1 (for example, the range of ±1 meter of d1) is obtained. When d2 is excluded from the given range that includes d1, the glasses-type wearable terminal 100 can only detect the person 600 at whom the user has gazed. In addition, since the glasses-type wearable terminal 100 may not perform the object detection process in the region of the person 601, a processing amount can be reduced.

Note that, although the glasses-type wearable terminal 100 detects the line-of-sight directions of both the right eye and the left eye, the terminal may detect only one line-of-sight direction. In this case, while accuracy in detection is lowered, one set out of the sets of the infrared cameras, the infrared projectors, the signal processing circuits, and the coordinate conversion units is unnecessary.

In addition, although the glasses-type wearable terminal 100 sets a detection range using detection results of line-of-sight directions and a depth map, a detection range may be set only using detection results of line-of-sight directions. When the depth map is not used, the object detection unit 242 performs, for example, edge detection on main image data and obtains each region surrounded by edges as candidate regions, and among the candidate regions, sets a region that includes a point-of-regard as a detection region. In this case, while accuracy in detecting an object is lowered, the right camera 115, the left camera 116, the signal processing circuits 132 and 133, and the depth acquisition unit 250 are unnecessary.

FIG. 32 is a flowchart showing an object detection process according to the third embodiment. The object detection process of the third embodiment is different from that of the first embodiment in that Steps S928, S929, and S930 are further executed.

The glasses-type wearable terminal 100 captures main image data and a pair of parallax image data pieces (Step S921 and S922), and captures left eye and right eye image data (Step S928). Then, the glasses-type wearable terminal 100 corrects a coordinate shift of the image data (Step S923), and generates a depth map (Step S924). Then, the glasses-type wearable terminal 100 detects line-of-sight directions (Step S929), and detects an object that the user gazes at using the line-of-sight directions and the depth map (Step S930). The glasses-type wearable terminal 100 displays the detection result of the object (Step S926), and then finishes the object detection process.

According to the third embodiment of the present technology as described above, the glasses-type wearable terminal 100 performs the object detection process in a region of a depth within a given range that includes the distance to a subject on a straight line in line-of-sight directions, and thus only an object that a user gazes at can be detected. By narrowing down a detection target only to an object that a user gazes at as described above, a processing amount of object detection when a plurality of objects are taken can be reduced.

First Modified Example

Although the glasses-type wearable terminal 100 of the third embodiment described above obtains a point-of-regard from the line-of-sight directions of both the left and right eyes, movement amounts of the left and right eyes are not necessarily the same. In general, the eyeball of one of the right and left eyes makes more extensive movements than the other, and that eye is called a dominant eye. Although a line of sight of the dominant eye coincides well with the actual line of sight of a user, a line of sight of the eye that is not the dominant eye does not coincide as well as that of the dominant eye. For this reason, there is concern of accuracy in detecting a point-of-regard deteriorating due to an influence of the line-of-sight direction of the eye that is not a dominant eye. A glasses-type wearable terminal 100 according to a first modified example of the third embodiment is different from that of the first embodiment in that deterioration in accuracy of detection in the line-of-sight direction of an eye that is not a dominant eye is suppressed.

FIG. 33 is a block diagram showing a configuration example of an image processing unit 200 according to the first modified example of the third embodiment. The image processing unit 200 of the first modified example of the third embodiment includes a line-of-sight direction detection unit 261 in place of the line-of-sight direction detection unit 260, and further includes an iris pattern detection unit 270, a dominant eye selection unit 280, and an iris pattern storage unit 290.

The iris pattern detection unit 270 detects an iris pattern in at least one of right eye image data and left eye image data (for example, only in the right eye image data). This iris pattern detection unit 270 supplies the detected iris pattern to the dominant eye selection unit 280.

The iris pattern storage unit 290 stores dominant eye information of each iris pattern indicating which of both eyes is the dominant eye.

The dominant eye selection unit 280 selects one of both eyes as a dominant eye from the right eye image data and left eye image data. When an iris pattern is detected, this dominant eye selection unit 280 determines whether the iris pattern is registered in the iris pattern storage unit 290. When the iris pattern is registered, the dominant eye selection unit 280 reads dominant eye information corresponding to the detected iris pattern from the iris pattern storage unit 290, and supplies the dominant eye information to the line-of-sight direction detection unit 261.

On the other hand, when the iris pattern is not registered, the dominant eye selection unit 280 analyzes a dynamic image composed of the right eye image data and a dynamic image composed of the left eye image data, and selects one with extensive movements as a dominant eye. The dominant eye selection unit 280 generates dominant eye information indicating the selected dominant eye, and registers the information in association with the detected iris pattern in the iris pattern storage unit 290. In addition, the dominant eye selection unit 280 supplies the generated dominant eye information to the line-of-sight direction detection unit 261. Since the dominant eye selection unit 280 automatically selects the dominant eye as described above, it is not necessary for the user to perform an operation of inputting the dominant eye.

When the dominant eye is selected by the dominant eye selection unit 280, the line-of-sight direction detection unit 261 detects a line-of-sight direction preferentially for the dominant eye. The line-of-sight direction detection unit 261, for example, detects only the line-of-sight direction of the dominant eye among both eyes. Alternatively, the line-of-sight direction detection unit 261 acquires more pieces of image data of the dominant eye than that of the eye that is not the dominant eye, detects the line-of-sight direction of the image data, and calculates statistics of the detection results.

On the other hand, when analysis of the dynamic images by the dominant eye selection unit 280 is not completed and thus the dominant eye is not selected, the line-of-sight direction detection unit 261 detects the line-of-sight directions of both eyes as in the third embodiment.

Note that, although the iris pattern detection unit 270 only performs detection of an iris pattern, the unit may further perform iris authentication in which whether a detected iris pattern coincides with a registered iris pattern is determined. In addition, although the glasses-type wearable terminal 100 automatically selects the dominant eye from image data of both eyes, a configuration in which a user manually inputs the dominant eye is also possible. In that case, the dominant eye selection unit 280 is unnecessary.

FIG. 34 is a table showing examples of dominant eye information with respect to each piece of iris pattern information according to the first modified example of the third embodiment. The iris pattern storage unit 290 stores iris pattern information and dominant eye information with respect to each identification information piece. The identification information is for identifying an iris pattern. For example, when a right eye is detected as the dominant eye of a person with a pattern A, the iris pattern storage unit 290 stores dominant eye information indicating "right eye" in association with "pattern A."

FIG. 35 is a flowchart showing an object detection process according to the first modified example of the third embodiment. The object detection process according to the first modified example of the third embodiment is different from that of the third embodiment in that, after generation of a depth map (Step S924), a line-of-sight detection process (Step S940) for detecting a line-of-sight direction is further executed.

FIG. 36 is a flowchart showing a line-of-sight detection process according to the first modified example of the third embodiment. The glasses-type wearable terminal 100 detects an iris pattern (Step S941), and determines whether the iris pattern is registered (Step S942). When the iris pattern is registered (Yes in Step S942), the glasses-type wearable terminal 100 reads dominant eye information corresponding to the detected iris pattern (Step S943). On the other hand, when the iris pattern is not registered (No in Step S942), the glasses-type wearable terminal 100 selects the dominant eye (Step S944), and registers the dominant eye information in association with the iris pattern (Step S945).

After Step S943 or S945, the glasses-type wearable terminal 100 detects a line-of-sight direction preferentially for the dominant eye (Step S946). After Step S946, the glasses-type wearable terminal 100 finishes the line-of-sight detection process.

According to the first modified example of the third embodiment of the present technology described above, the glasses-type wearable terminal 100 selects one of both eyes as the dominant eye and detects a line-of-sight direction preferentially for the dominant eye, and thus accuracy in detecting the line-of-sight direction can be improved.

Second Modified Example

The glasses-type wearable terminal 100 of the third embodiment described above two-dimensionally displays detection results of objects; however, since detection results are two-dimensionally displayed even though real objects are three-dimensionally viewed through a transmissive display, there is concern of a sense of reality lacking. A glasses-type wearable terminal 100 according to a second modified example of the third embodiment is different from that of the third embodiment in that a sense of reality is improved.

FIG. 37 is a block diagram showing a configuration example of an image processing unit 200 according to the second modified example of the third embodiment. The image processing unit 200 according to the second modified example of the third embodiment is different from that of the third embodiment in that a stereoscopic image generation unit 300 is further provided.

An object detection unit 240 of the second modified example of the third embodiment supplies display data indicating an object detection result and distance information indicating depth to the detected object to the stereoscopic image generation unit 300.

The stereoscopic image generation unit 300 generates right display data and left display data with regard to parallax according to the distance information from the display data. The stereoscopic image generation unit 300 supplies the right display data to a right transmissive display 151 and the left display data to a left transmissive display 152. These displays three-dimensionally display a detection result at the position of an object in the optical axis direction that the user gazes in.

FIG. 38 is a diagram showing an example of a display position of a stereoscopic image according to the second modified example of the third embodiment. A horizontal coordinate of the right display data (for example, the horizontal coordinate of the center) is set to $U_R$, and a horizontal coordinate of the left display data is set to $U_L$. A horizontal coordinate is assumed to have a smaller value as it moves to the left from the user. In this case, for example, a value obtained by subtracting $U_L$ from $U_R$ is used as a parallax DIF.

Here, the distance between the left eye and the right eye is assumed to be a base distance B, the distance from the viewer to the display unit 150 is assumed to be Dm, and the display position of a stereoscopic image in the depth direction that three-dimensionally appears is assumed to be Dp. In this case, a triangle formed by the right eye, the left eye, and the center of the stereoscopic image is similar to a triangle formed by $U_R$, $U_L$, and the center of the stereoscopic image, and thus the following Formula 7 is satisfied.

$$DIF:Dm=B:Dp \qquad \text{Formula 7}$$

With Formula 7 above, the parallax DIF is calculated from the designed values of Dp, B, and Dm indicating distance information, and thus a pair of display data pieces with the parallax DIF are generated.

According to the second modified example of the third embodiment of the present technology described above, the glasses-type wearable terminal 100 generates a pair of display data pieces with parallax according to the depth at which an object is detected, and thus a stereoscopic image can be displayed at the position at which the object is detected. By displaying the stereoscopic image in that manner, a sense of reality can be improved.

Third Modified Example

Although the glasses-type wearable terminal 100 of the third embodiment described above causes the right infrared projector 181 and the left infrared projector 182 to continuously emit light, there is a problem that such light emission leads to an increase in power consumption of the glasses-type wearable terminal 100. A glasses-type wearable terminal 100 according to a third modified example of the third embodiment is different from that of the third embodiment in that power consumption attributable to light emission of the right infrared projector 181 and the left infrared projector 182 is reduced.

FIG. 39 is a block diagram showing a configuration example of the glasses-type wearable terminal 100 according to the third modified example of the third embodiment. The glasses-type wearable terminal 100 according to the third modified example of the third embodiment is different from that of the third embodiment in that a light emission control unit 171 is provided in place of the light emission control unit 170.

The light emission control unit 171 receives not only a vertical synchronization signal VSYNC but also an exposure control signal indicating an exposure time. In addition, the light emission control unit 171 causes the right infrared projector 181 and the left infrared projector 182 to intermittently emit light in synchronization with the vertical synchronization signal VSYNC.

Here, the right infrared camera 117 and the left infrared camera 118 perform capturing in a rolling shutter method in which a plurality of lines of an image is sequentially exposed. In this case, it is desirable to perform continuous light emission through a given light emission period including an exposure period from a start of exposure of a first line to an end of exposure of the last line. This is because, when the infrared projectors are caused to intermittently emit light by switching control in the exposure period, there are differences in infrared receiving times of the lines, and thus there is a concern that an accurate right eye image and an accurate left eye image are not obtained. For example, the light emission control unit 171 causes light emission to be performed at a timing earlier than the start of exposure and to be finished at a timing later than the end of exposure in synchronization with the vertical synchronization signal VSYNC.

FIG. 40 is a timing chart showing an example of an operation of the glasses-type wearable terminal 100 according to the third modified example of the third embodiment.

The reference signal generation unit 120 generates the vertical synchronization signal VSYNC at timings such as T1, T2, and T3 that are time points with a given interval. In addition, the right infrared camera 117 and the left infrared camera 118 start or finish exposure in synchronization with the vertical synchronization signal VSYNC. For example, at a time point T11 at which a given period has elapsed from the time point T1, the right infrared camera 117 and the left infrared camera 118 start exposure of the first line. After the time point T11 passes, exposures of the second and the succeeding lines are sequentially started. Then, at a time point T21 at which a given period has elapsed from the time point T2, the right infrared camera 117 and the left infrared camera 118 finish exposure of the last line. In addition, the infrared cameras start exposure of the first line at a time point T22 at which a given period has elapsed from the time point T2, and finish exposure of the last line at a time point T31 at which a given period has elapsed from the time point T3.

On the other hand, the light emission control unit 171 causes light emission to be performed at a timing earlier than the start of exposure of the first line and to be finished at a timing later than the end of exposure of the last line in synchronization with the vertical synchronization signal VSYNC. For example, the light emission control unit 171 causes the right infrared projector 181 and the left infrared projector 182 to emit light through the period from a timing immediately before the time point T11 to a timing immediately after the time point T21. In addition, the light emission control unit 171 causes light emission to stop in the period from the timing immediately after the time point T21 to a timing immediately before the time point T22. Then, the light emission control unit 171 causes the right infrared projector 181 and left infrared projector 182 to emit light through the period from the timing immediately before the time point T22 to a timing immediately after the time point T31.

According to the third modified example of the third embodiment of the present technology described above, the light emission control unit 171 causes the infrared projectors to emit light only in the given periods including the exposure periods, and thus power consumption can be reduced more than when light emission is continuously performed.

Fourth Modified Example

The right infrared camera 117 and the left infrared camera 118 perform exposure in the rolling shutter method in the third modified example of the third embodiment described above. In the rolling shutter method, however, timings of the start of exposure and the end of exposure are different depending on the lines, and thus a phenomenon in which an image is distorted when a moving object is captured (which is so-called rolling shutter distortion) occurs and flickering occurs when fluorescent light is captured. A glasses-type wearable terminal 100 of a fourth modified example of the third embodiment is different from that of the third modified example in that the rolling shutter distortion and flickering are suppressed.

Here, in the rolling shutter method of the third modified example, there are differences in infrared receiving times of the lines when the infrared projectors intermittently emit light in the exposure periods, and thus the light emission control unit 171 causes light emission to be continuously performed through the light emission periods including the exposure periods. In a rolling shutter method of the fourth modified example, however, even when the infrared projectors intermittently emit light at exposure times, there is no difference in infrared receiving times of lines. Therefore, the light emission control unit 171 of the fourth modified example causes infrared light to be intermittently emitted at exposure times, and thus can further reduce power consumption.

FIG. 41 is a timing chart showing an example of an operation of the glasses-type wearable terminal 100 according to the fourth modified example of the third embodiment. The right infrared camera 117 and the left infrared camera 118 start exposure of all lines at the same time. For example, the right infrared camera 117 and the left infrared camera 118 start exposure of all lines at the time point T11, and finish exposure of all lines at the time point T21.

On the other hand, the light emission control unit 171 starts intermittent light emission at a given duty ratio at a timing of a start of exposure of all lines, and finish intermittent light emission at a timing of an end of exposure of all lines in synchronization with a vertical synchronization signal VSYNC. For example, the light emission control unit 171 causes the right infrared projector 181 and the left infrared projector 182 to intermittently emit light through the period from the time point T11 to the time point T21. In addition, the light emission control unit 171 causes light emission to stop in the period from the time point T21 to the time point T22. The light emission control unit 171 causes the right infrared projector 181 and the left infrared projector 182 to intermittently emit light through the period from the time point T22 to the time point T31.

In addition, the light emission control unit 171 can adjust light emission intensity by controlling a duty ratio of a light emission control signal that causes the right infrared projector 181 and the left infrared projector 182 to emit light. Such control of changing a pulse width (i.e., a duty ratio) is called pulse width modulation (PWM) control.

Note that, although the light emission control unit 171 causes intermittent light emission to be performed only in the exposure times, the unit may cause intermittent light emission to be performed through an imaging period including an exposure time. In addition, the light emission control unit 171 may cause light emission to be continuously performed through a given light emission period that is longer than the exposure time as in the third modified example.

According to the fourth modified example of the third embodiment of the present technology described above, imaging is performed in the global shutter method in which the light emission control unit 171 starts exposure of all lines at the same time, and thus the rolling shutter distortion and flickering can be suppressed.

The above-described embodiments illustrate examples for realizing the present technology, and matters in the embodiment and technology specifying matters in the scope of claims have correspondence relation respectively. Similarly, the technology specifying matters in the scope of claims and the matters in the embodiment of the present technology, to which the same names are attached, have the correspondence relation respectively. However, the present technology is not limited to the embodiments and can be realized by variously modifying the embodiments without departing from the spirit of the technology.

The processing procedures described in the above embodiment may be recognized as a method having a series of the procedures, or may be recognized as a program for making a computer execute a series of the procedures or a non-transitory computer-readable recording medium having the program recorded thereon. As the recording medium, for instance, a compact disc (CD), a minidisc (MD), a digital versatile disc (DVD), a memory card, and a Blu-ray (registered trademark) disc or the like are usable.

[Application Embodiment]

The technology according to the present disclosure can be applied to various products. For example, the technology according to the present disclosure may be realized as a device equipped with a mobile body of either kind such as automobiles, electric automobiles, hybrid electric automobiles, motorcycles, bicycles, personal mobility, aircraft, drones, ships, and a robot.

FIG. 42 is a block diagram showing a schematic configuration example of a vehicle control system 2000 which is an example of a mobile control system technology according to the present disclosure may be applied. The vehicle control system 2000 includes a plurality of electronic control units connected through a communication network 2010. In the example shown in FIG. 42, the vehicle control system 2000 includes a drive system control unit 2100, the body system control unit 2200, a battery control unit 2300, an outside information detection subsystem 2400, an in-vehicle information detection unit 2500, and the integrated control unit 2600. The communication network 2010 for connecting the plurality of control units may be an in-vehicle communication network in conformity with any standards such as CAN (Controller Area Network), LIN (Local Interconnect Network), LAN (Local Area Network) or FlexRay (registered trademark).

Each control unit includes a microcomputer for performing arithmetic processing according to various programs, a storage unit for storing the parameters and the like used in the program or various operations are performed by the microcomputer, a drive circuit for driving the device for various control target equipped with. The control unit includes a network I/F for performing communication with other control units via the communication network 2010 and a communication I/F to communicate by a wired or wireless communication between devices inside and outside the car or sensors.

Outside information detection subsystem 2400 detects the external information of the vehicle having the vehicle control system 2000. For example, the outside information detection subsystem 2400 is connected with at least one of an imaging unit 2410 and an outside information detection unit 2420. The image pickup unit 2410 includes at least one of a ToF (Time Of Flight) camera, a stereo camera, a monocular camera, the infrared camera and other camera. The outside information detection unit 2420 includes, for example, at least one of environmental sensors for detecting the current weather or weather and surrounding information detection sensors for detecting other vehicles around, obstacles or pedestrians.

The environmental sensor, for example, may include at least one of a raindrop sensor for detecting rain, a fog sensor for detecting fog, a sunshine sensor for detecting the sunshine degree, and a snow sensor for detecting snow. The surrounding information detection sensor may be at least one of an ultrasonic sensor, a radar device, and a LIDAR (Light Detection and Ranging, Laser Imaging Detection and Ranging). The imaging unit 2410 and the outside information detection unit 2420 may be provided as an independent sensor or device, or as a plurality of sensors or devices as an integrated device.

Here, FIG. 43 shows an example of position of the imaging unit 2410 and the outside information detection unit 2420. Imaging units 2910, 2912, 2914, 2916, and 2918, for example, are provided with at least one of a front nose, a side mirror, a rear bumper, a back door and an upper portion of a front glass of an interior of the vehicle 2900. The imaging unit 2910 provided in the front nose and the imaging unit 2918 provided in the upper portion of the front glass of the vehicle interior acquire mainly images in front of the vehicle 2900. The imaging units 2912 and 2914 provided with the side mirrors acquire mainly images in sides of the vehicle 2900. The imaging unit 2916 provided with the rear bumper or the back door acquires mainly images in back of the vehicle 2900. The imaging unit 2918 provided with the upper portion of the front glass of the vehicle interior uses for detecting preceding vehicles, pedestrians, obstacles, traffic signals, and traffic lanes.

In FIG. 43 an example of imaging ranges of the imaging units 2910, 2912, 2914, and 2916 are shown. An imaging range "a" shows an imaging range of the imaging unit 2910 provided in the front nose, an imaging ranges "b" and "c" respectively are an imaging range of the imaging units 2912 and 2914 provided in the side mirrors, and an imaging range "d" shows an imaging range of the imaging unit 2916 provided in the rear bumper or the back door. For example, an overhead image which viewed the vehicle 2900 from above is obtained by superimposing image data taken by the imaging units 2910, 2912, 2914, and 2916.

Outside information detection units 2920, 2922, 2924, 2926, 2928, and 2930 provided with the front, the rear, the sides, the corners and the upper portion of the front glass respectively may be, for example, an ultrasonic sensor or a radar device. The outside information detection units 2920, 2926, and 2930 provided with the front nose, the rear bumper, the back door and the upper portion of the front glass of the interior of the vehicle 2900 may be, for example, the LIDAR device. The outside information detection units from 2920 to 2930 are primarily used for the detection of preceding vehicles, pedestrians or obstacles.

Referring back to FIG. 42, the outside information detection subsystem 2400 instruct the imaging unit 2410 to capture image of outside the vehicle and receives the image data captured. Further, the outside information detection subsystem 2400 receives detection information from the outside information detection unit 2420 which are connected. If the outside information detection unit 2420 is an ultrasonic sensor, a radar device or the LIDAR system, the outside information detection subsystem 2400 transmits ultrasonic waves or electromagnetic waves or the like, and receives information of the received reflected wave. The outside information detection subsystem 2400 may perform an object detection processing or a distance detection processing for human, vehicles, obstacles, traffic signals or characters on the road surface based on the received information. The outside information detection subsystem 2400 may perform an environment detection processing for detecting rain, fog, or road surface conditions based on the received information. The outside information detection subsystem 2400 may calculate the distance to the outside object based on the received information.

Further, the outside information detection subsystem 2400, based on the received image data, may perform an image recognition processing or a distance detection processing for recognizing human, vehicles, obstacles, letters or the like on the traffic signals or the road surface. The outside information detection subsystem 2400 may perform a distortion correction processing and an alignment processing with respect to the received image data, synthesize the image data captured by different imaging unit 2410, and generate an overhead image or panoramic image. The outside information detection subsystem 2400, using the image data captured by different the imaging unit 2410 may perform a viewpoint conversion processing. Further, the processing performed by the outside information detection unit 2400 may be performed by the integrated control unit 2600 which receives the image data captured by the imaging unit 2400.

The integrated control unit 2600 controls the overall operation of the vehicle control system 2000 according to various programs. The integrated control unit 2600 comprises, an input unit 2800. The input unit 2800 may be realized by devices which is operable by a driver such as a touch panel, buttons, microphones, switches, or levers or the like. The integrated control unit 2600 may receive data, which is got after a voice recognition processing, as an input. Input unit 2800, for example, may be a remote control device using infrared or other radio waves, or an external connection device such as a mobile phone or PDA (Personal Digital Assistant) corresponding to the operation of the vehicle control system 2000. The input unit 2800, for example, may be a camera, in which case the user can input information by gestures. Alternatively, the data is inputted by detecting the motion of the wearable device mounted by the user. Further, the input unit 2800, for example, may include an input control circuit to produce an input signals based on information input by the user and to output them to the integrated control unit 2600. The user inputs various data and instructs processing operation to the vehicle control system 2000 by operating the input unit 2800.

An audio and video output unit 2670 transmits at least one of output signals of audio and video data to an output device which is possible to notify information visually or aurally to the user or the vehicle outside. In the example of FIG. 42, an audio speaker 2710, a display unit 2720 and the instrument panel 2730 are illustrated as the output device. The display unit 2720, for example, may include at least one of the on-board display and a head-up display. The display unit 2720 may have an AR (Augmented Reality) display function. The output device may be other device such as headphones, a projector, a lamp or wearable devices, for example an eyeglass-type wearable display for the driver. When the output device is a display device, it displays outcomes obtained through various processing by the microcomputer 2610 or information received from other control units, visually in various types of format such as text, image, chart, graph and so on. When the output device is an audio output device, it converts audio signals including reproduced audio data or sound data into analog signals, and outputs them aurally.

In the example shown in FIG. 42, at least two control units connected via the communication network 2010 may be integrated into a single control unit. Alternatively, each control unit may be configured by a plurality of control units. Further, the vehicle control system 2000 may be provided with a separate control unit, not shown. Further, in the above description, a part or all function of any one of the control units may be implemented in other control units. That is, predetermined operation processing may be performed with any one of the control units if the transmission and reception of information perform through the communication network 2010. Similarly, while sensors or devices connected to any one of the control units are connected to other control units, a plurality of control units transmit and receive detection information with each other via the communication network 2010.

Furthermore, computer programs to realize each function of the glass-type wearable terminal 100 according to the present embodiment described with reference to FIG. 42 may be installed in any one of the control units in the vehicle control system 2000. In addition, a computer-readable storage media in which such computer programs were stored may be provided. The computer-readable storage media may be, for example, a magnetic disk, an optical disk, a magneto-optical disk, or a flash memory. Furthermore, the computer program may be distributed via a network without the computer-readable storage media.

The vehicle control system 2000 described above, the glass-type wearable terminal 100 according to the present embodiment described with reference to FIG. 3 may be applied to the vehicle control system 2000 for application embodiment shown in FIG. 42. For example, the camera unit 110 and the display unit 150 of the glass-type wearable terminal 100 correspond to the imaging portion 2410 and the display unit 2720 of the vehicle control system 2000. The signal processing unit 130 and the image processing unit 200 of the glass-type wearable terminal 100 correspond to the outside information detection subsystem 2400 and the microcomputer 2610 of the vehicle control system 2000.

At least some of the components of the glass-type wearable terminal 100 described with reference to FIG. 3 may be implemented by a module (e.g., an integrated circuit module formed of one die) for the vehicle control system 2000 shown in FIG. 42. Alternatively, the glass-type wearable terminal 100 described with reference to FIG. 3 may be implemented by a plurality of control units in the vehicle control system 2000 shown in FIG. 42.

Effects described in the present description are just examples, the effects are not limited, and there may be other effects.

Additionally, the present technology may also be configured as below.

(1)

An image processing device including:

a depth acquisition unit configured to acquire a depth in an optical axis direction of a lens that forms a main image in association with each of pixels in the main image; and an object detection unit configured to execute an object detection process of detecting a specific object in a detection region composed of the pixels corresponding to the depth in the optical axis direction within a predetermined range.

(2)

The image processing device according to (1), wherein the depth acquisition unit acquires the depth from a parallax of a pair of parallax images of which imaging ranges at least partially overlap an imaging range of the main image.

(3)

The image processing device according to (1) or (2), wherein, when instructed to detect the specific object, the depth acquisition unit acquires the depth in association with each of the pixels in the main image, and the object detection unit executes the object detection process in the detection region, and wherein, when instructed to acquire the depth, the object detection unit executes the object detection process on the entire main image, and the depth acquisition unit acquires the depth in association with each of the pixels in a region of the main image in which the specific object is detected.

(4)

The image processing device according to any of (1) to (3), further including:

a line-of-sight direction detection unit configured to detect a line-of-sight direction of at least one of a left eye and a right eye based on an eye image obtained by capturing at least one of the left eye and the right eye, wherein the object detection unit executes the object detection process in a given range including a distance to a subject positioned on a straight line in the line-of-sight direction as the predetermined range.

(5)

The image processing device according to (4), further including:

a dominant eye selection unit configured to select one of the left eye and the right eye as a dominant eye based on the eye image, wherein the line-of-sight direction detection unit detects the line-of-sight direction preferentially for the dominant eye.

(6)

The image processing device according to (5), further including:

an iris pattern detection unit configured to detect an iris pattern of at least one of the left eye and the right eye based on the eye image; and an iris pattern storage unit configured to store the dominant eye selected for a person with the corresponding iris pattern for the detected iris pattern, wherein the dominant eye selection unit reads the dominant eye corresponding to the detected iris pattern from the iris pattern storage unit.

(7)

The image processing device according to any of (1) to (6), further including:

a correction unit configured to correct a shift of coordinates of each of the pixels in the main image from predetermined reference coordinates and supply the result to the object detection unit.

(8)

The image processing device according to (7), wherein the correction unit includes a distortion correction table in which uncorrected coordinates before the shift of the coordinates is corrected and corrected coordinates after the shift is corrected are retained in association with some representative points of the pixels, and an interpolation unit configured to obtain coordinates interpolated from the corrected coordinates corresponding to each of four uncorrected coordinates in the periphery of the pixel that does not correspond to the representative point as coordinates for which the shift of the coordinates is corrected.

(9)

An imaging device including:

a main image capturing unit configured to capture a main image using a lens that forms the main image;

a depth acquisition unit configured to acquire a depth in an optical axis direction in association with each of pixels in the main image; and an object detection unit configured to execute an object detection process of detecting a specific object in a detection region composed of the pixels corresponding to the depth in the optical axis direction within a predetermined range.

(10)

The imaging device according to (9), further including:

a parallax image capturing unit configured to capture a pair of parallax images of which imaging ranges at least partially overlap an imaging range of the main image, wherein the depth acquisition unit acquires the depth from a parallax of the pair of parallax images.

(11)

The imaging device according to (10), wherein the main image capturing unit captures the main image in synchronization with a first synchronization signal with a first frequency, wherein the parallax image capturing unit captures the pair of parallax images in synchronization with a second synchronization signal with a second frequency, and wherein a ratio of the first frequency and the second frequency is an integer ratio.

(12)

The imaging device according to (10) or (11), further including:

an exposure control unit configured to control exposure periods of the main image capturing unit and the parallax image capturing unit to have the same value.

(13)

The imaging device according to any of (9) to (12), further including:

an eye image capturing unit configured to capture an image of at least one of a left eye and a right eye as an eye image; and a line-of-sight direction detection unit configured to detect a line-of-sight direction of at least one of the left eye and the right eye based on the eye image, wherein the object detection unit executes the object detection process in a given range including a distance to a subject positioned on a straight line in the line-of-sight direction as the predetermined range.

(14)

The imaging device according to (13), further including:

an infrared projector configured to emit infrared light; and a light emission control unit configured to control the infrared projector to emit the infrared light, wherein the eye image capturing unit captures the eye image by photoelectrically converting the infrared light.

(15)

The imaging device according to any of (9) to (14), further including:

an acceleration sensor configured to detect an acceleration of the imaging device, wherein the main image capturing unit captures the main image in synchronization with a synchronization signal with a higher frequency as the acceleration increases.

(16)

The imaging device according to any of (9) to (15), further including:

a stereoscopic image generation unit configured to generate a pair of display data pieces having a parallax according to the depth to the specific object; and a display unit configured to display the pair of display data pieces.

(17)

An image processing method including:

a depth acquisition procedure in which a depth acquisition unit acquires a depth in an optical axis direction of a lens that forms a main image in association with each of pixels in the main image; and an object detection procedure in which an object detection unit executes an object detection process of detecting a specific object in a detection region composed of the pixels corresponding to the depth in the optical axis direction within a predetermined range.

(18)

A program causing a computer to execute:

a depth acquisition procedure in which a depth acquisition unit acquires a depth in an optical axis direction of a lens that forms a main image in association with each of pixels in the main image; and an object detection procedure in which an object detection unit executes an object detection process of detecting a specific object in a detection region composed of the pixels corresponding to the depth in the optical axis direction within a predetermined range.

(19)

An image processing device including:

an object detection unit configured to execute an object detection process of detecting a specific object in a main image; and a depth acquisition unit configured to acquire a depth in an optical axis direction of a lens that forms the main image from a parallax of a pair of parallax images of which imaging ranges at least partially overlap an imaging range of the main image in association with each of pixels in a region in which the specific object is detected.

(20)

An image processing device including:

a line-of-sight direction detection unit configured to detect a line-of-sight direction of at least one of a left eye and a right eye based on an eye image obtained by capturing at least one of the left eye and the right eye; and an object detection unit configured to execute an object detection process of detecting a specific object in a detection region of a main image in which a subject positioned on a straight line in the line-of-sight direction is captured.

(21)

An image processing device comprising:

depth acquisition circuitry configured to use a parallax corresponding to image data to electronically generate a depth map of an image, the depth map includes information that pertains to distances from a reference position for each pixel in the image; and object detection circuitry configured to use distance information and the depth map to electronically detect a specific object in the image by identifying specific pixels in the image data.

(22)

The image processing device according to (21), wherein the distance information is a range of distances between a first distance and a second distance.

(23)

The image processing device according to (21), wherein the distance information is a value.

(24)

The image processing device according to (21), wherein the object detection circuitry is configured to use the distance information and the depth map to identify a detection region of the image.

(25)

The image processing device according to (24), wherein the detection region includes pixels that have depth information.

(26)

The image processing device according to (21), wherein an imaging range of the image data overlaps an image range of first image data and an imaging range of second image data.

(27)

The image processing device according to (26), wherein a resolution of the first image data is lower than a resolution of the image data.

(28)

The image processing device according to (27), wherein the first image data and the second image data have a same resolution.

(29)

The image processing device according to (21), wherein a resolution of the parallax is lower than a resolution of the image data.

(30)

The image processing device according to (21), wherein the parallax is a monochromic image data.

(31)

The image processing device according to (21), further comprising:

correction circuitry configured to correct a coordinate of any pixel in the image data that has shifted from a predetermined reference coordinate.

(32)

An image processing system comprising:

depth acquisition circuitry configured to use a parallax corresponding to image data to electronically generate a depth map of an image, the depth map includes information that pertains to distances from a reference position for each pixel in the image;

object detection circuitry configured to use distance information and the depth map to electronically detect a specific object in the image by identifying specific pixels in the image data; and a camera device configured to capture the image as a visual field and convert the visual field into the image data.

(33)

The image processing system according to (32), further comprising:

a first camera device configured to capture a first image; and a second camera device configured to capture a second image, wherein the parallax is generated from first image data and second image data, the first image data corresponds to the first image and the second image data corresponds to the second image.

(34)

The image processing system according to (33), wherein the object detection circuitry is configured to produce display data of the specific object to be displayed.

(35)

The image processing system according to (34), further comprising:
display circuitry configured to output the display data as a viewable image.

(36)

The image processing system according to (33), wherein an imaging range of the image data overlaps an image range of the first image data and an imaging range of the second image data.

(37)

The image processing system according to (36), wherein a resolution of the first image data is lower than a resolution of the image data.

(38)

The image processing system according to (37), wherein the first image data and the second image data have a same resolution.

(39)

The image processing system according to (33), wherein a resolution of the parallax is lower than a resolution of the image data.

(40)

The image processing system according to (33), wherein the parallax is a monochromic image data.

(41)

The image processing system according to (32), wherein the camera device is mounted to a pair of eyeglasses.

REFERENCE SIGNS LIST 100 glasses-type wearable terminal
101, 102 rim
110 camera unit
111 main camera
112 imaging lens
113 aperture
114 imaging sensor
115 right camera
116 left camera
117 right infrared camera
118 left infrared camera
120, 121 reference signal generation unit
130 signal processing unit
131, 132, 133, 134, 135 signal processing circuit
140 exposure control unit
150 display unit
151 right transmissive display
152 left transmissive display
160 acceleration sensor
165 recording unit
170, 171 light emission control unit
181 right infrared projector
182 left infrared projector
200 image processing unit
210 correction unit
211 coordinate shift calculation unit
212, 213, 214, 215, 220 coordinate conversion unit
221 correction range storage unit
222 read address counter
223 write address counter
224 read address decoder
225 write address decoder
226 distortion correction table
227 distortion correction address generation unit
228 delay adjustment unit
229 distortion correction address decoder
230 write control unit
231 read control unit
232 image memory
233 interpolation processing unit
240, 241, 242 object detection unit
250, 251 depth acquisition unit
260, 261 line-of-sight detection unit
270 iris pattern detection unit
280 dominant eye selection unit
290 iris pattern storage unit
300 stereoscopic image generation unit

The invention claimed is:

1. An image processing unit comprising:
depth acquisition circuitry configured to:
receive a first electronic image of various objects after a first camera captures the first electronic image,
receive a second electronic image of the various objects after a second camera captures the second electronic image, and
process a parallax of the first electronic image and the second electronic image in a manner that generates a depth map, the depth map includes information pertaining to distances from a reference position to the various objects; and
object detection circuitry configured to:
receive a main electronic image of the various objects after a main camera captures the main electronic image,
process the depth map so as to obtain a detection region of the main electronic image, and
detect, in the detection region, a specificone of the various objects without detecting another of the various objects in any other region of the main electronic image,
wherein a first one of the distances is larger than a predetermined value.

2. The image processing unit according to claim 1, wherein the object detection circuitry is configured to associate, in advance, coordinates of pixels in the depth map to coordinates of pixels in the main electronic image.

3. The image processing unitaccording to claim 2, wherein the depth map shows depths of the pixels in the main electronic image.

4. The image processing unit according to claim 1, wherein an imaging range of the first electronicimage overlaps an imaging range of the second electronic image and an imaging range of the main electronic image.

5. The image processing unit according to claim 4, wherein the imaging range of the main electronic image overlaps the imaging range of the first electronic image and the imaging range of the second electronic image.

6. The image processing unit according to claim 1, wherein a resolution of the first electronic image is lower than a resolution of the main electronic image.

7. The image processing unitaccording to claim 6, wherein a resolution of the second electronic image is lower than the resolution of the main electronic image.

8. The image processing unit according to claim 1, wherein color information is absentfrom the first electronic image and is absent from the second electronic image.

9. The image processing unit according to claim 8, wherein the main electronic image includes the color information.

10. The image processing unitaccording to claim 1, wherein the object detection circuitry is configured to convert pixels in the detection region into display data.

11. The image processing unit according to claim 10, wherein the object detection circuitry is configured to prevent an excluded pixel from being in the display data, the excluded pixel is a pixel in the main image that is outside of the detection region.

12. The image processing unit according to claim 10, wherein the display data includes a detection result from the group consisting of a contour of the specific one of the various objects and a frame that surrounds the specific one of the various objects.

13. An image processing device comprising:
   the image processing unit according to claim 10; and
   a terminal that includes a display unit that outputs the display data as a viewable image.

14. The image processing device according to claim 13, wherein the reference position is at the terminal.

15. The image processing device according to claim 13, wherein the terminal includes the first camera, the second camera, and the main camera.

16. The image processing device according to claim 13, further comprising:
   an external interface that outputs the main electronic image.

17. The image processing device according to claim 13, further comprising:
   an external interface that outputs the display data.

18. The image processing device according to claim 13, wherein the display unit includes a first transmissive display.

19. The image processing device according to claim 18, wherein the display unit includes a second transmissive display.

* * * * *